COMPUTER DATA STORAGE SYSTEM

Filed May 23, 1963 15 Sheets-Sheet 1

INVENTOR.
REX RICE

BY [signature]
ATTORNEY

Nov. 29, 1966 R. RICE 3,289,175

COMPUTER DATA STORAGE SYSTEM

Filed May 23, 1963 15 Sheets-Sheet 3

Nov. 29, 1966 R. RICE 3,289,175

COMPUTER DATA STORAGE SYSTEM

Filed May 23, 1963 15 Sheets-Sheet 4

COMPUTER DATA STORAGE SYSTEM

Filed May 23, 1963 15 Sheets-Sheet 7

Nov. 29, 1966 R. RICE 3,289,175

COMPUTER DATA STORAGE SYSTEM

Filed May 23, 1963 15 Sheets-Sheet 8

TIMING CHART

United States Patent Office 3,289,175 Patented Nov. 29, 1966

3,289,175

COMPUTER DATA STORAGE SYSTEM

Rex Rice, Los Altos, Calif., assignor to International Business Machines Corporation, New York, N.Y., a corporation of New York Filed May 23, 1963, Ser. No. 282,807
49 Claims. (Cl. 340—172.5)

The present invention relates to a computer data organization and to means for storing and searching such data.

More specifically the present system provides means for automatically storing and searching data which has a definite structure or hierarchy. This hierarchy is denoted by special symbols included in the data and when the data is input into the system the location of the special symbols is denoted in a separate auxiliary memory wherein the storage location in the auxiliary memory is directly relatable to the location of the associated data in the main storage unit. The system provides for the more functional addressing of data in main memory and reduces the requirements made of the programmer. It further provides for the storage of variable field length and variable format data without the imposition of any limitations other than that the structure of the data be indicated directly therein.

In general a digital computer system may be thought of as an information or data processing system which accepts data in one form and delivers it in an unaltered form after performing some "operations" on it. In every case, it simply processes the input data according to rules specified by the operator. These rules, as well as the data, must be put into a form intelligible to the computer. However, many types of computers exist today, and each, seemingly, understands a different dialect of a character language. Consequently, if one is to use a computer as a processing system he is faced with the problem of the translation of the problem description and solution from the language which he employs to that which the machine understands. The original function of the "programmer" was to perform such translation. However, because of the tedium of a job that is essentially mechanical though complex, programmers attempted to reduce the actual amount of actual translating required. This was accomplished by the development of automatic programming. Here the machine itself performs many of the tedious, trivial translation tasks. In this technique, the problem is described in a problem oriented language such as FORTRAN, ALGOL, or COBOL. Compilation and assembly schemes are then used to enable machine translation of this input into a machine language description. The compiling and assembly programs themselves become very complex and large as the capabilities and flexability of the machine system are increased.

The investigation of such problem areas as pattern processing and recognition, list processing, game theory, operations research, learning and artificial intelligence, experimental programming, simulation and other advanced data processing research requires an extremely flexible and powerful data processing system able to manipulate data efficiently and to perform most record keeping tasks automatically. The types and structure of the data used in these areas are many and varied. The types of operation to be performed on these data are complex in comparison with the abilities of present computers. Consequently, new artificial languages are developed to describe these problem areas and their solutions, and the necessary compiler and assembly programs are written. This cycle continues to produce a steady flow of new software or programming packages for new and existing hardware systems. It becomes apparent that the combination of compilation and assembly is not necessarily the best bridge for the gap between problem oriented and machine languages.

Of course, the elimination or at least reduction in these two steps in problem solving would also have economic advantages for the user.

One possible approach to producing a powerful machine language is by taking a machine of the present type, an IBM 7090 for example, and adding more hardware. However, a language, especially a powerful language, may impose requirements which are difficult to implement in the present type of machine system. Therefore, a computer which has a high level language as its machine language should have a machine oganization which is determinned only by the property of the language. Only in this way will the hardware remain reasonable.

As stated previously, the most obvious way of making a problem oriented language the machine language of a system is to implement one or a combination of the existing languages directly in hardware. However, all commonly used problem oriented languages have the same difficulty, they are written for some special purpose, i.e., solution of scientific problems, or of business problems or of list processing problems, etc. None of these languages has the broad range of ability that a general purpose language should have. To allow the machine language to be the sum of all problem oriented languages commonly used is somewhat impractical. Rather than using such existing "problem oriented languages for computers," it appears more reasonable to look at the data being processed, to study a language in which to describe the processing of this data independent of computers and then to implement this language in hardware. If this implemented language also is to be machine independent, any limitations or restrictions to the language due to machine organization must be eliminated.

The type of data occurring in the above mentioned problem areas, as well as in the majority of the common data processing areas presently used, is not of the form directly acceptable by most present day computers, such form being a contiguous string of fixed length, fixed point data. Such data in the present computers must be tailored and interpreted to fit within the said fixed length, fixed point storage systems which are available in such present day computers. Data normally occurs as variable field length, variable format, structured and not necessarily contiguous. The English language, considered as data, is grouped as words in phrases, in sentences, in paragraphs, in chapters, in books and in libraries. No matter what one calls these groupings, the structure they indicate does exist in data. Clearly, each symbol in a string of data can contain any number of characters.

Further, a string of data may not necessarily be contiguous. If another symbol is to be inserted into that string, it is normally necessary to store the symbol at only one place and form a link to the phrase wherever it normally occurs. Such a technique is far more satisfactory and certainly more efficient than an insert procedure which moves the entire string to make room for the inserted data.

The use of such a data system internally reduces the need to program controlled housekeeping or data record keeping to a minimum. For example, the assignment of storage space is completely automatic and data operations are independent of data format; that is, if the data is not in the precise proper format for any given operation, the machine control will do the necessary conversion from any permissible format to the desired one.

As stated previously it has now been found that variable field length hierarchically organized data can be handled in a much more flexible manner in a machine that automatically examines the data, breaks it up according to the hierarchical structure indicated therein, keeps track of the storage locations of the structure and further provides for the automatic searching of this structure which simplifies the searching and reading out of data from memory.

It is accordingly a primary object of the present invention to provide an automatic machine storage and searching system for variable field length hierarchically organized data.

It is a further object to provide such a system which is capable of detecting hierarchical level identifier marks in the data breaking up the data according to the indicated structure and keeping track of the location of the various levels of data with a data string.

It is another object to utilize an auxiliary memory for storing occurrences of all levels of data and wherein the location of such an occurrence indication within the auxiliary member is directly relatable to the address of that portion of data in the main memory.

It is yet another object of the invention to provide an improved search system for the above data organization whereby the auxiliary memory may be searched automatically to provide for a high speed access to a given bit of data within a string by stating its relationship in the hierarchy within a minimum of absolute addressing.

It is still another object to accomplish the above search by reading out a portion of said auxiliary memory, searching and counting occurrence marks stored therein and automatically deriving the absolute address of the desired portion of data solely from said search of the auxiliary memory.

It is another object to provide the necessary hardware implementation to accomplish the above objects.

The foregoing and other objects, features and advantages of the invention will be apparent from the following more particular description of preferred embodiments of the invention, as illustrated in the accompanying drawings.

FIGURES 2*a*–2*h* constitute a logical schematic diagram of a preferred control embodiment of a system utilized to accomplish the objects of the instant invention.

Figures 3, 3A:
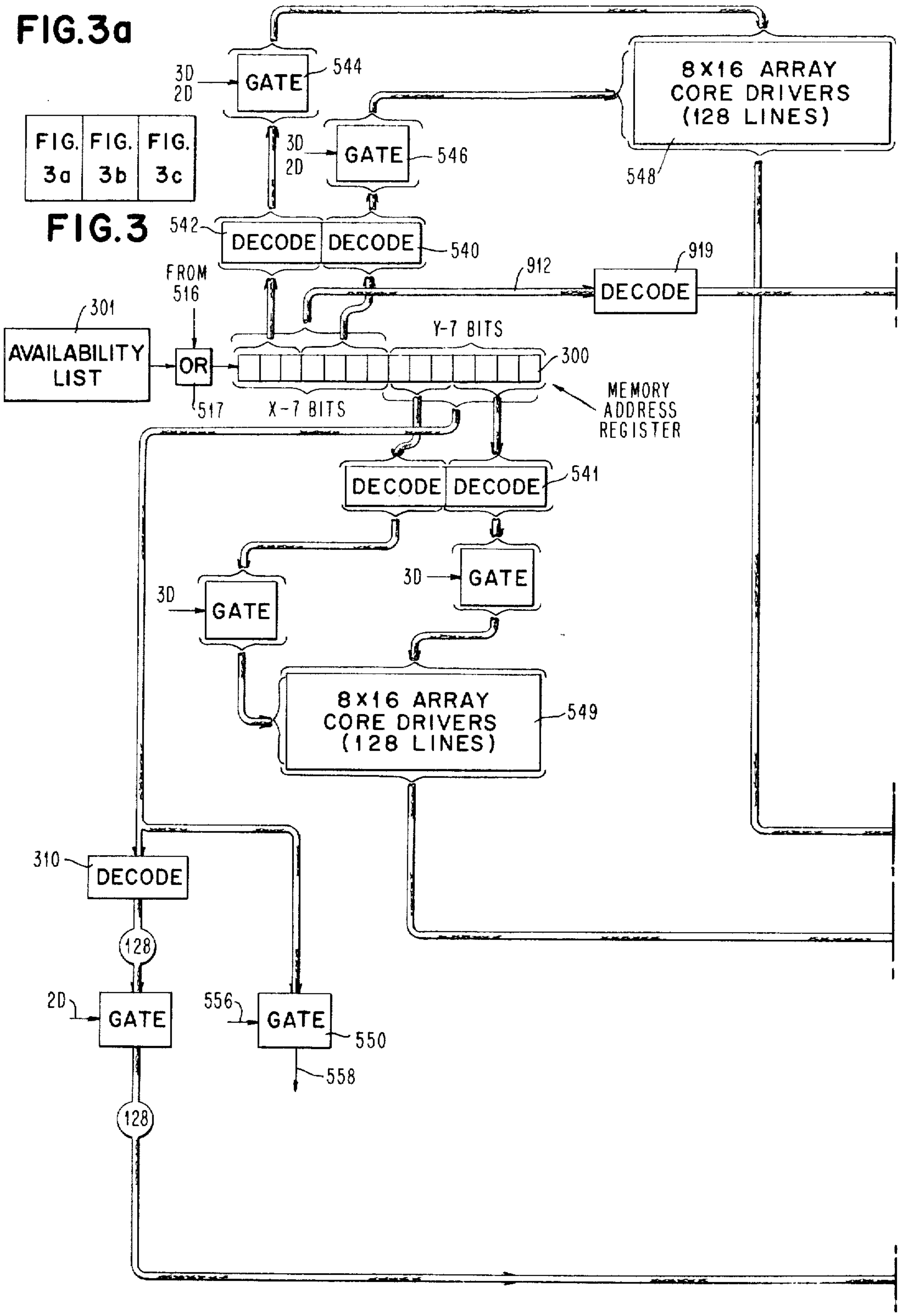
Figure 3B:
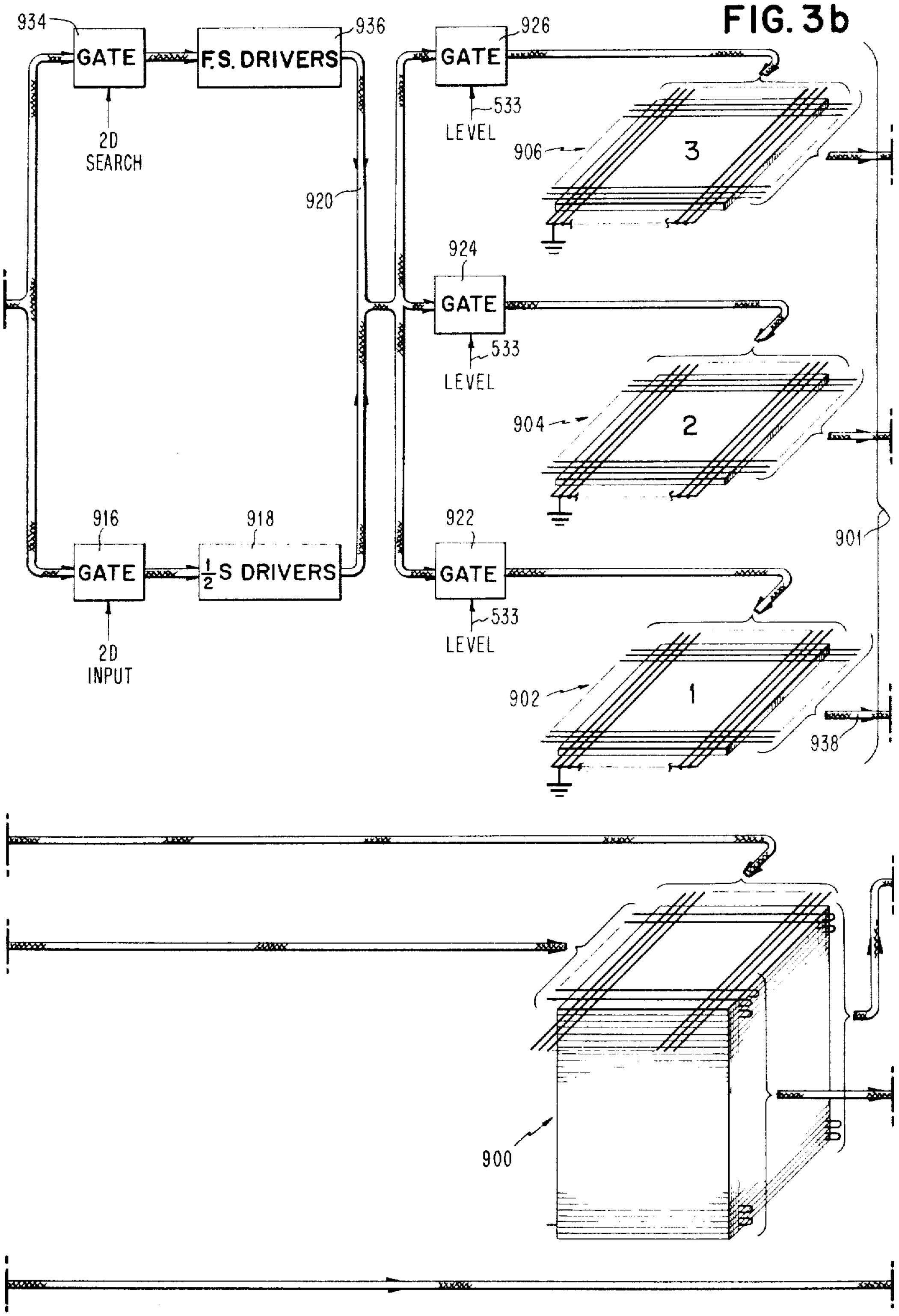
Figure 3C:
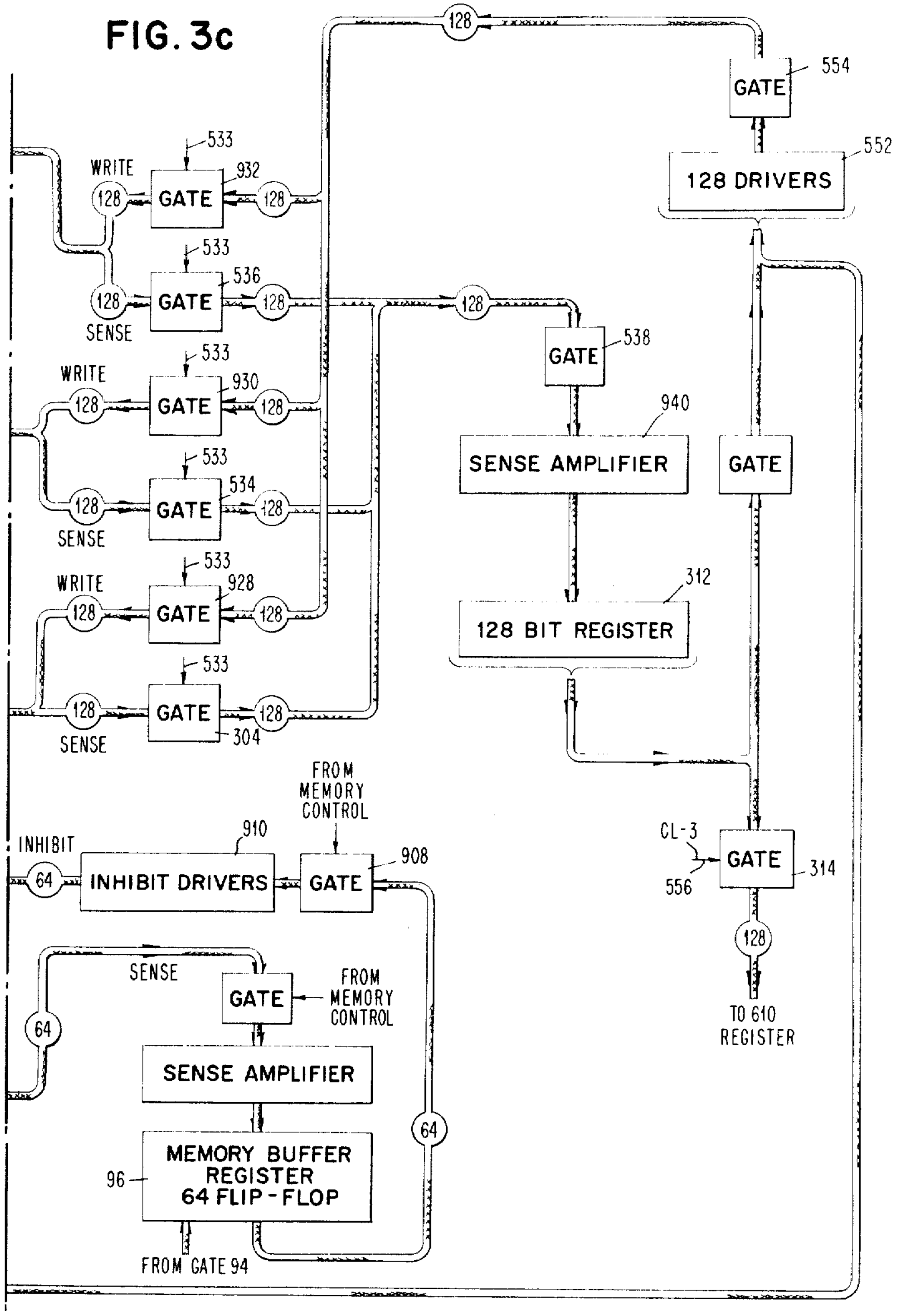

FIGURES 3*a*–3*c* constitute a logical schematic diagram partly in block form illustrating some of the details of the memory control circuitry.

Figure 4:
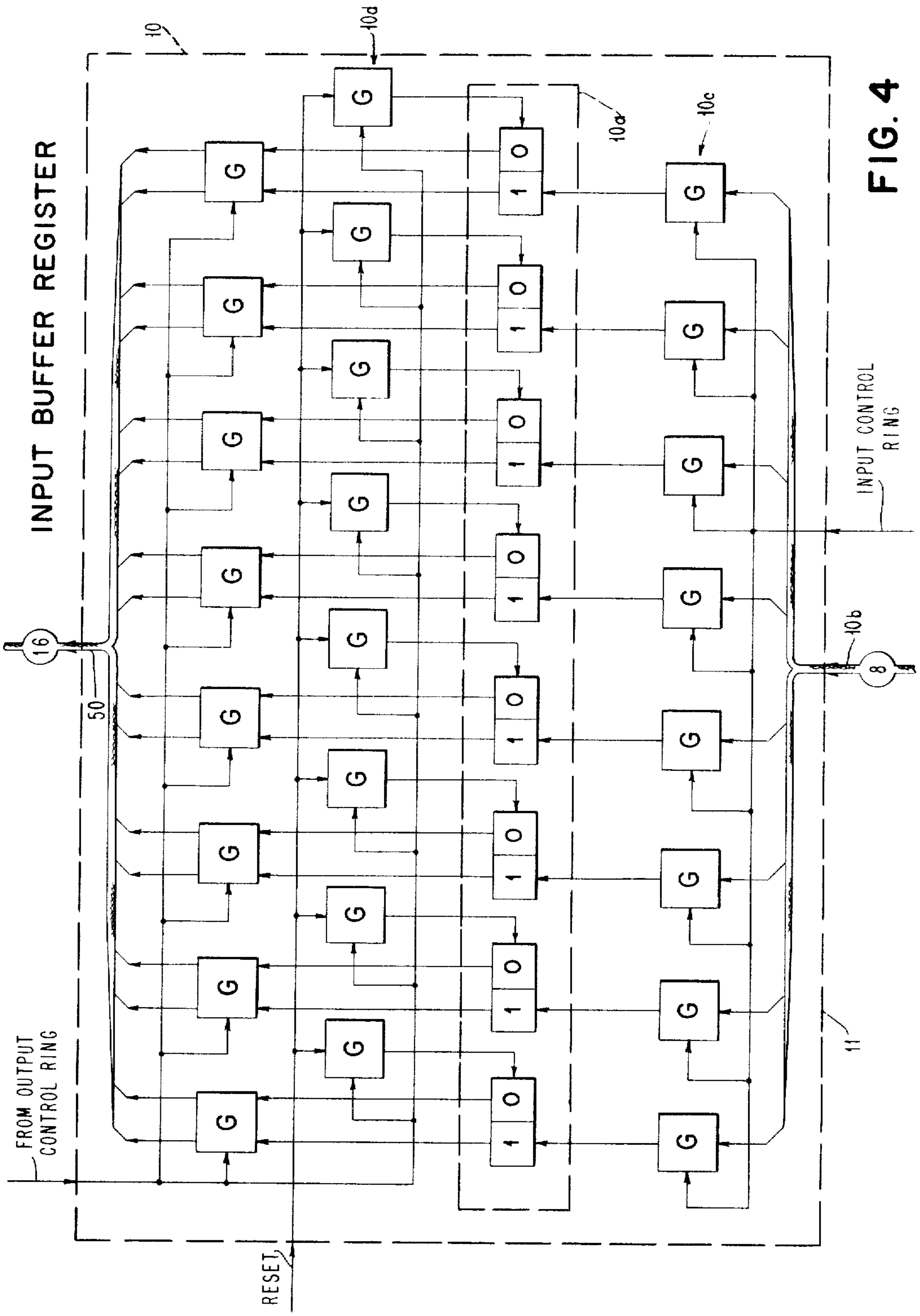

FIGURE 4 is a detailed logical schematic diagram of one stage of the input buffer showing the storage register and necessary gates for inputing and reading out one character of data.

Figure 5:
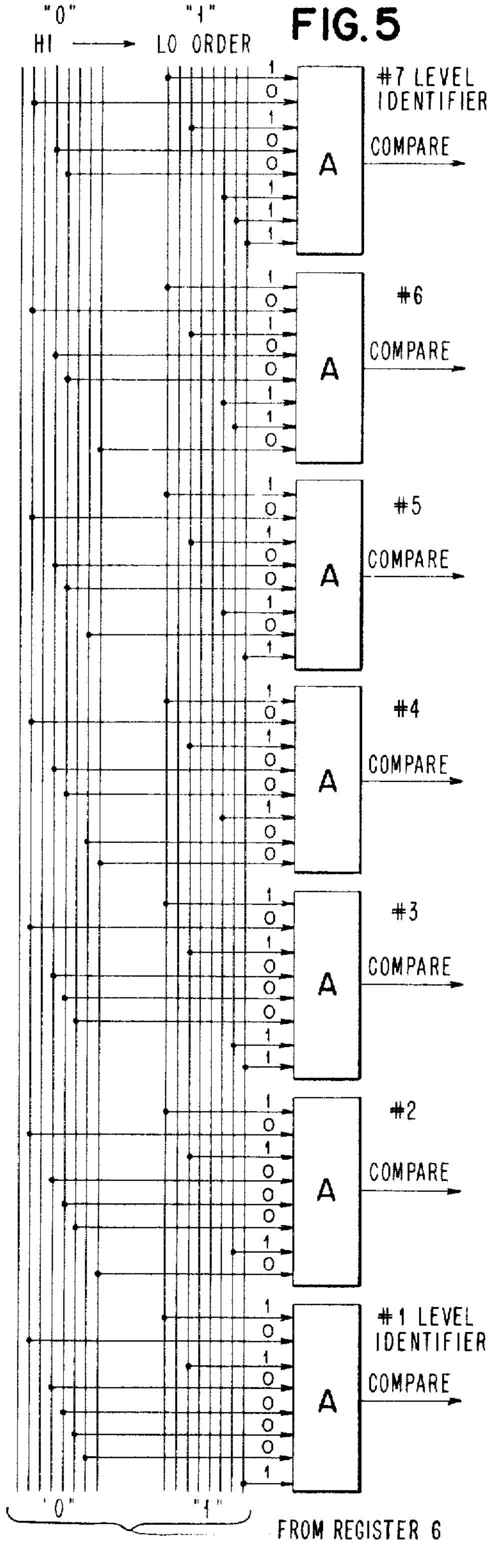
Figure 5A:
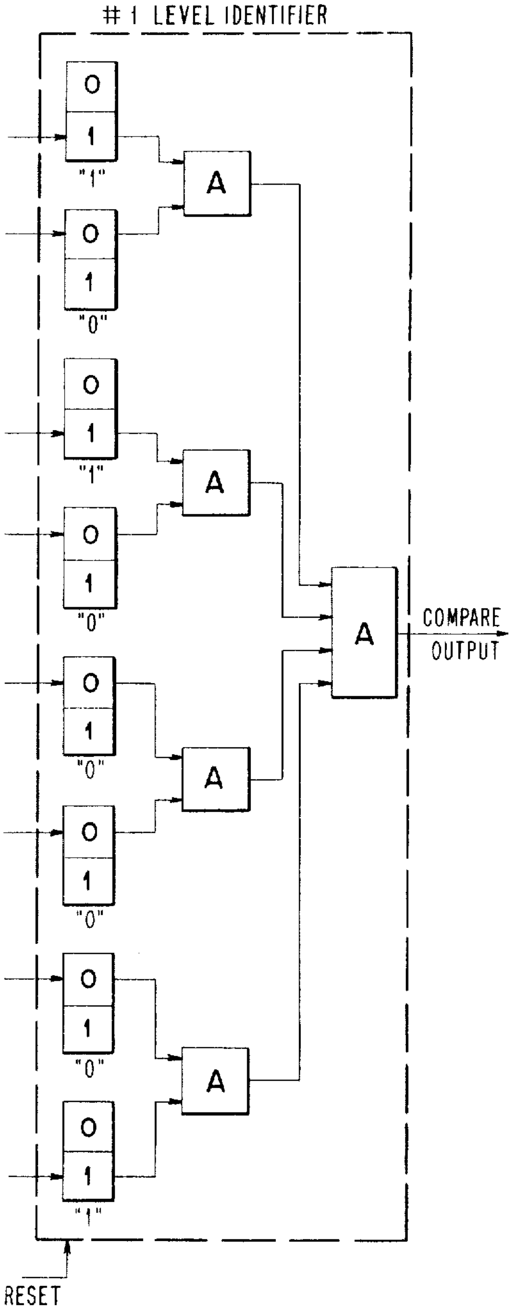
Figure 6:
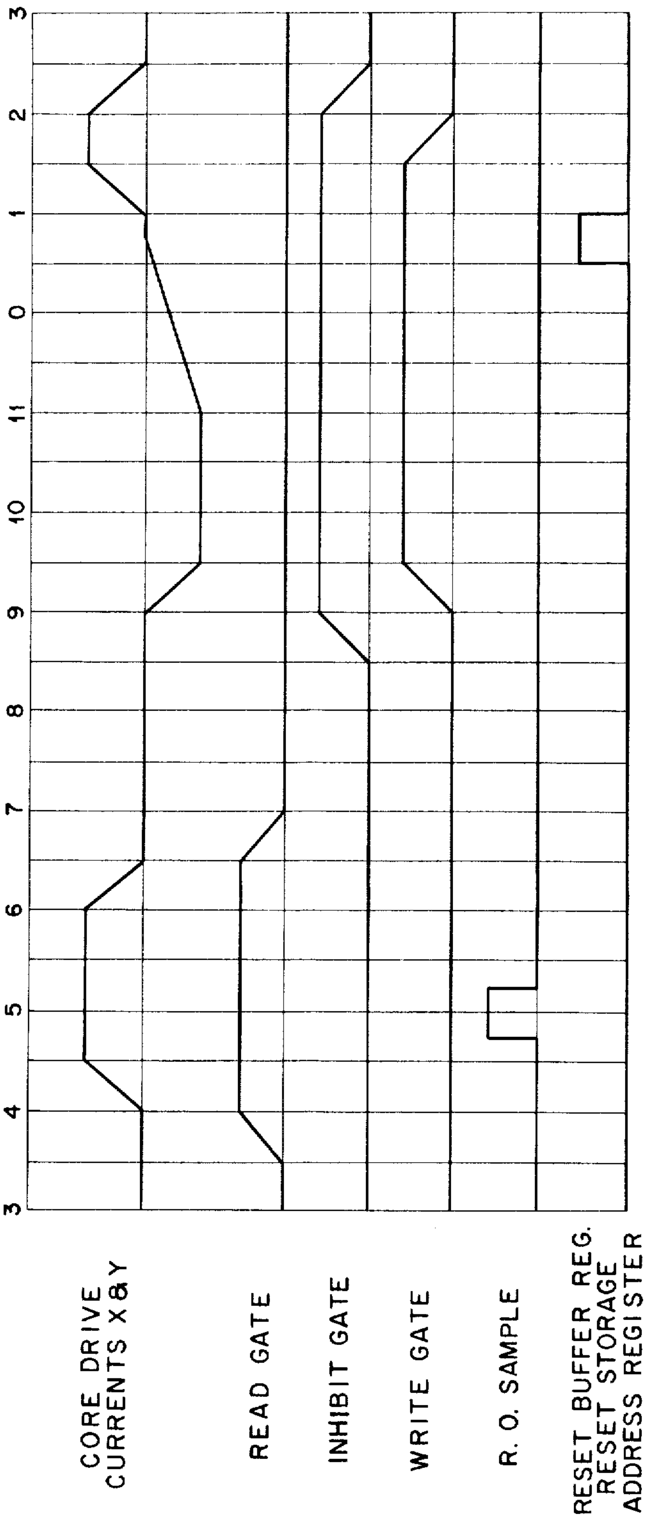

FIGURE 5, is a logical schematic diagram of one embodiment of the compare circuitry incorporated in the system of the invention, FIGURE 5A is a logical schematic of one of the A Level Identifier blocks FIGURE 5, and, FIGURE 6 is a timing chart illustrating the sequence of events occurring during a read-write cycle of the main 3-dimensional (3–D) memory.

The symbol 3–D will be used in the remainder of the specification to denote the concept of three dimensional when referring to the memory organization. The same system will be used for denoting a two dimensional organization, i.e., 2–D.

The objects of the present invention are accomplished in general by an internal computer data storage system and data organization wherein the data is hierarchically organized in levels and each level in data contains identifying marks for that level. The storage system utilizes auxiliary memory having a plurality of discrete storage sections associated with main storage in which a "level occurrence mark" will be stored whenever the particular associated level of data is detected and stored in main memory. Each section of the auxiliary memory is used to mark occurrences of only one hierarchical level in the data, and the location or address of said mark in the auxiliary memory gives the address of the associated level of data in main memory. The system is further provided with search control circuitry which automatically provides for the searching of the auxiliary memory to find the absolute address of particular portions of data within a long data string when only given the beginning address of the entire string and the relative location of the desired portion in the hierarchy.

There is thus provided the basis for a far more direct and logical machine language which avoids much of the involved programming of present day computers. It provides many of the rapid search advantages of "associative memories" and at the same time possesses the additional advantages of being able to store variable field length data and does not limit the search to a known field in a fixed data format as is necessary with such "associative memories."

Figure 1:
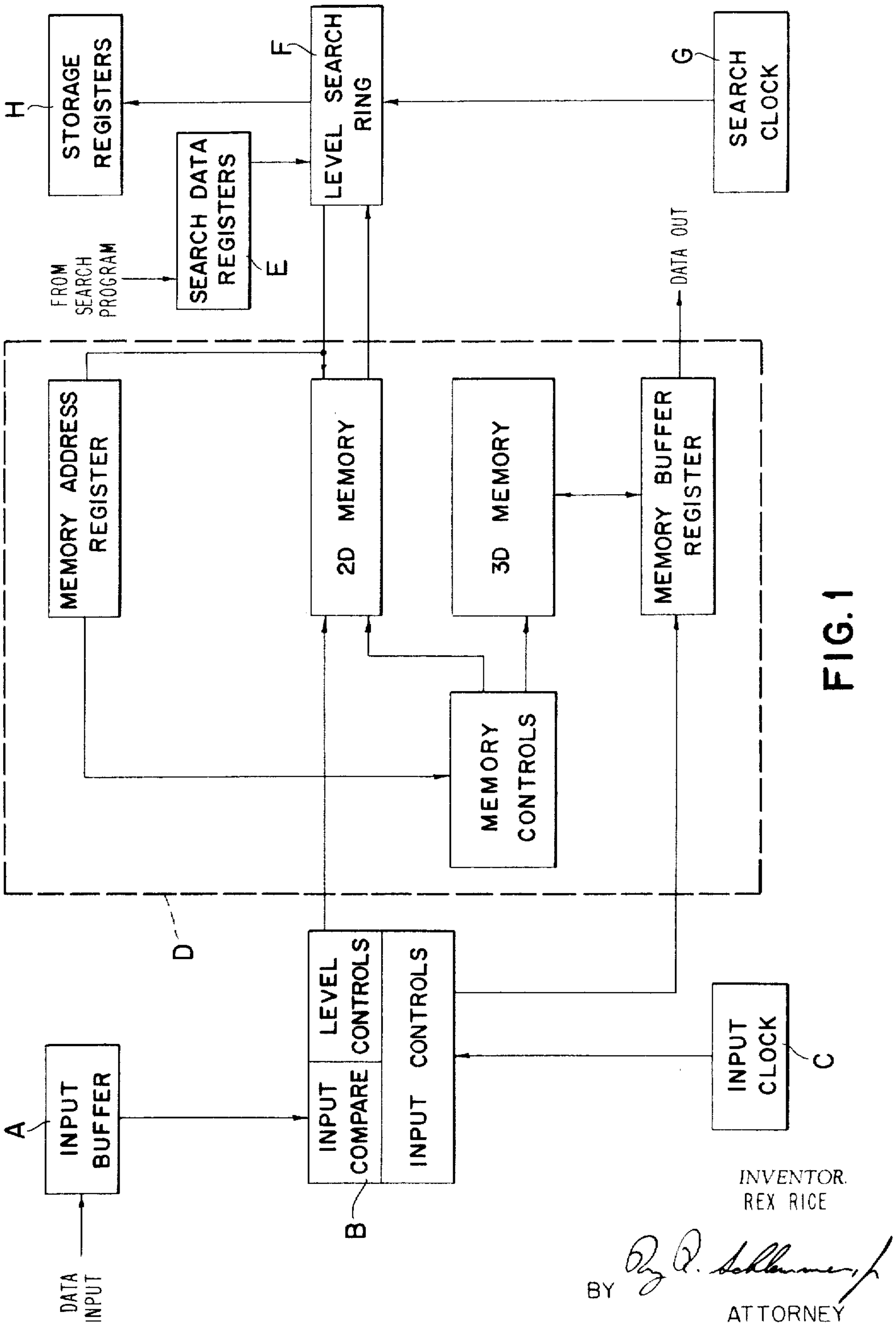
FIGURE 1 is a functional block diagram of the data storage and search system of the present invention.

To better aid in the understanding of the present invention, the invention will be described first with reference to the hierarchically organized language or data format to be used. Secondly, a general description of the system organization will be presented with reference to the major functional blocks shown in FIG. 1. Next a broad description of each functional block will be presented referring to the purpose of the most significant portions thereof as shown in the detailed logical schematic of the control circuitry shown in FIG. 2 wherein the functional blocks of FIG. 1 are indicated by the dotted lines and labelled with the same reference characters as in FIG. 1. And last a complete input operation and search operation are described in detail and the specific operation of each logical block is described.

*Data format*

In general, any group of data consists of strings of symbols. A 3 x 3 matrix, for example, is a string of nine symbols. In this case, the symbols are usually numbers. But, more than just a string of symbols, a hierarchy or grouping, is usually imposed on the string. In this matrix example, the grouping consists of symbols which are contained in rows which are contained in the matrix. This is a simple grouping. As stated previously, English language considered as hierarchical data, is grouped as follows: symbols (or words) are in phrases, are in sentences, are in paragraphs, are in chapters, are in books, are in libraries. The symbol is the lowest meaningful grouping—e.g., the character "*b*" has no meaning, but the characters "ball" do represent something and, therefore, make up a symbol. The four characters *b–a–l–l* are a symbol for the actual ball. Another grouping is as follows:

Fields.
Records.
Groups.
Blocks.
Tapes.
Files.
Libraries.

The data groupings or levels are often used terminology in the computer art where "fields" would be the lowest or least significant member of the hierarchy. The subsequent names or levels ascend in order to "libraries" which is the highest or most encompassing member of the group. However, no matter what these groupings may be called, they exist within the data and in the data organization anticipated by the present invention are indicated by special identifier marks. These identifiers appear as special symbols in a data string which indicate the end of one group and the start of a new group. Many different such marks may be used, depending upon the names which have been given to the grouping. In order to avoid unnecessary confusion, the following groups of hierarchical levels will be used throughout the remainder of the specification, it being understood that these names have no other significance per se than to give convenient names to the various hierarchical levels.

| Identification mark: | Group name character |
|---|---|
| ① | Symbol. |
| ② | Phrase. |
| ③ | Sentence. |
| ④ | Paragraph. |
| ⑤ | Chapter. |
| ⑥ | Book. |
| ⑦ | Library. |

As stated previously when the structure of a string of data or instructions is to be identified, these identifiers are used and incorporated directly in the later string. The ① identifier will indicate the end of a symbol and the start of a new symbol. These identifiers form a heirarchy in that a ② also implies a ①, a ③ implies a ②, and a ①, etc. If more than one identifier ever appears together with no other characters separating them, all but the highest identifier will be neglected and dropped.

With this type of data format using the apparatus to be set forth more fully subsequently, the occurrence of the various level or identifier marks, i.e., ①, ②. ③, etc., in a string of data to be stored in the memory are marked in special "identifier" planes in the memory. Each available machine word in the main memory has a storage cell available in each of these planes wherein the occurrence of that particular level of data in the machine word may be marked by a binary "1," as is well known.

Each string of data symbols can be given a name which, for the purposes of this invention, might be considered the highest level word in the data string. This name may be comprised of any combination of any number of characters, such as the words, alpha, beta or gamma indicated as being of a certain level and subsequent levels of the string are purely numeric. The only restriction on such a name is that a particular combination of characters have no more than one meaning. These names are stored in a name table together with their addresses in one system utilizing the present data storage system and the use of the name by the programmer will automatically provide the beginning address for the later string. It is of course, obvious to one skilled in the art that other systems could equally well be used to determine the beginning address of a string including the absolute address per se.

An example of a typical machine instruction as anticipated by the present invention could be as follows:

$$A①\uparrow 7+(B③\uparrow 5②\uparrow 2①\uparrow 6\times C①\uparrow 1)\rightarrow D①\uparrow 4$$

wherein the arrows simply mean the number following describes the level identifier preceding the arrow thus ①↑7 means the seventh ① in the data string whose name and address is A. A, B, C and D are names of data strings and as stated above may be easily related to an address. Thus, the above instruction is all that is required of programmer to perform the indicated mathematical computation using the data storage and search system of the present invention.

In order to illustrate instructional programming, the following comparison with typical devices is made.

This instruction will replace at the minimum the following IBM 704 machine instruction:

05600004736 $(B\rightarrow MQ)$
02000004737 $(MQ\times C\rightarrow Acc, MQ)$
04000004735 $(Acc+A\rightarrow Acc)$
06010004740 $(Acc\rightarrow D_1)$
—06000004741 $(MQ\rightarrow D_2)$ where:

4735 is the location of A
4736 is the location of B
4737 is the location of C
4740 is the location of first 36 bits of D and:

4741 is the location of last 36 bits of D

It will be readily apparent that if A, B or C were data strings of more than the allowed number of bits in one 704 machine word, a much more extensive series of instructions would be required.

The significance of the above comparison of a typical IBM 704 Computer instruction program with that of the instant system is that the absolute addresses of A, B, C and D are completely machine generated in that the data is automatically searched and located by merely naming same in the instruction. The machine obviously must do more work but the simplification of the programming is very obvious. Thus, the present system is a departure from prior art systems where the function of the hardware depends on very rigid rules for data format, length and even content.

Having outlined the form of data or the data structure utilized in the present invention, the apparatus necessary to effect the aforementioned objects will now be described.

Any machine memory or data storage system utilizing the data format outlined above in accordance with the invention must obviously have means for storing the data in accordance with said format, have means for accessing said data and be able to use the data structure to facilitate searching and/or any other instruction which may prove necessary or desirable. FIGURE 1, which is a functional block diagram of the data storage system envisioned by the present invention, provides a broad basis for understanding the operation of said system.

It is, of course, to be understood that for the present invention to be operative, to be able to break up and store incoming data into the hierarchically organized memory system as described above, said data must have been broken up or grouped in accordance with the desires of a particular operator previously. That is, the particular level identifier marks which are to be used, namely the ①-⑦ set forth above with the symbol through book type of a designation must have been previously accomplished in accumulating or assembling the data whether it be on punched cards, paper or magnetic tape. When such data is placed on the permanent storage element such as the cards or tapes, it may be entered manually; for example, it may be punched in binary form by a key punch operator or the like. In such a manual system, the identifier marks are merely inserted in the data string between words as indicated previously with a conventional 8 bit binary designation. The following list of 8 bit characters is merely intended to be exemplary of a code used in an embodiment of the present invention, it being understood that any convenient code which is compatible with the over-all data handling system being used could likewise be utilized in the machine. Of course, the compare circuit which will be more fully described later would have to be revised to produce a signal upon recognition of the particular level identifiers being used.

① 10100001
② 10100010
③ 10100011
④ 10100100
⑤ 10100101
⑥ 10100110
⑦ 10100111

Thus, in an incoming string of data these particular level identifier bits will be placed at appropriate locations in the string of 8 bit characters being put into machine storage.

It should perhaps be noted that the reason an 8 bit code is used is that the level identifiers will be mixed in with all data being input and in a flexible over-all system in excess of 200 recognizable characters including the alpha-numeric characters, special symbols and the level identifiers symbols will be used. Accordingly, an 8 binary bit code is necessary.

In describing a preferred embodiment of the present invention, several limitations will be placed upon the format of the data placed in storage; however, it is to be understood that the invention is not intended to be limited hereby. Referring to Table I which follows, a typical data string consisting of a personnel record of an employee is to be placed in the main memory. The data string is as follows:

④ 080964 ② JOE $^{s}_{p}$ GLOPNEYER ① 1956 WEST 4th STREET ① POUGHKEEPSIE, N.Y. 4.

The manner in which this data string would be stored in main memory according to the teachings of the present invention is illustrated in Table I.

TABLE I

| | | | | | | | | | | | |
|---|---|---|---|---|---|---|---|---|---|---|---|
| ⑦ | | | | | | | | | | | Special Core Planes 2-D Memory |
| ⑥ | | | | | | | | | | | |
| ⑤ | | | | | | | | | | | |
| ④ | * | | | | | | | | | | |
| ③ | * | | | | | | | | | | |
| ② | * | * | | | | | | | | * | |
| ① | * | * | | * | | | * | | | * | |
| | ④ | ② | P | ① | T | E | ① | E | Y | ② | Main Memory |
| | O | J | M | I | 4 | T | P | P | . | - | |
| | 8 | 0 | E | 9 | T | ~~N~~ | O | S | ~~N~~ | - | |
| | 0 | E | Y | 5 | H | ~~N~~ | U | I | ~~N~~ | - | |
| | 9 | s p | E | 6 | S | ~~N~~ | G | E | ~~N~~ | - | |
| | 6 | G | R | W | T | ~~N~~ | H | , | ~~N~~ | - | |
| | 4 | L | ~~N~~ | E | R | ~~N~~ | K | ~~N~~ | ~~N~~ | - | |
| | N | O | ~~N~~ | S | E | ~~N~~ | E | . | ~~N~~ | - | |

The upper portion of the table indicated by the bracket and marked Special Core Planes 2D Memory shows to the extreme right ①–⑦ wherein each of its circles indicate a special core plane. The lower section enclosed with the bracket and entitled Main Memory represents a data string stored in binary form through main memory actually, as will be well understood by a person skilled in the art, each of the alphabetical representation would be placed in a binary code. As may be seen from this lower portion of the figure, each vertical column represents a machine word of 8 characters. Thus, a machine word having 64 bit storage positions would be necessary for eight, 8 bit per character machine words. It will be noted that the identifier marks ①–⑦ always occur at first position or first character position in any machine word and never are located down through the word. It will further be noted that where one portion of the data string between two identifier marks was less than 8 characters, a null character indicated by ~~N~~ has been inserted in that position of memory to indicate a null and that the search procedure or read-out is to proceed automatically through to the next position having information other than a null stored therein. It will further be noted that when more than 8 characters appear between two level identifier marks the first position of a machine word may not necessarily be an identifier mark, as in the case of the third column where P, which is a continuation of the employee's last name from the previous column, has been carried over into the first position of this machine word. As in the previous case where the end of the employee's name does not completely fill a machine word before the next word level identifier occurs, two null characters are automatically inserted to fill out the remainder of this machine word.

Referring again to the upper portion of Table I, in the 2D Memory it will be noted that the asterisk indicates that a binary "1" or an occurrence mark has been placed in the special core planes at an address location corresponding to a machine word in main memory which contains such special level or identifier mark. It will further be noted that where a ④ or ② occurs, all of the subsequent level marks, i.e., ③ ② ① and ①, respectively, are placed in the special core planes again corresponding to the particular machine word in which the upper or dominant level indicator occurred.

The system set forth in block diagram form in FIGURE 1 is capable of automatically examining an incoming data string of the type referred to above and automatically placing it in main storage in accordance with the rules discussed and illustrated in Table I. Section A entitled, "Input Buffer," serves the function of taking data from a relatively low speed input system, storing it temporarily and outputing it into the machine at a higher speed of which the machine is capable of operating. It functions merely as a temporary buffer storage and allows the actual machine circuitry to operate at optimum efficiency. The data flows from this input buffer into what may be generically referred to as an input compare and control section designated B.

The input data is taken from the input buffer A a character at a time and brought into the compare and control circuitry block indicated B. This block functions to examine each character and determine whether or not it is one of the chosen level indicator marks, i.e., ①–⑦ and if so, to break up the data string in accordance with the rules set forth above. Referring to Table I, for example, it automatically places the level identifier marks in the number 1 position of a machine word, automatically provides for insertion of occurrence marks in the suitable special 2D core planes, it automatically keeps count of the characters in a machine word so that the memory buffer register will read each series of 8 characters out as they occur into main memory and automatically will read a character out of the memory buffer register into main memory when a second level identifier occurs before a total of 8 characters are placed in the memory buffer register and further operates in conjunction with the memory buffer register resetting mechanism to automatically insert null characters in the proper positions of the memory buffer register for subsequent read-out and storage.

The input clock section C functions to control the sequential operation of the input compare and control circuitry of Section B.

As stated previously, data is fed from Section B directly to the memory buffer register which gates such information into main memory in accordance with the input clock C. The level marks are similarly placed in the proper positions in the 2D memory from the counting register of the input compare circuitry which will be explained in more detail subsequently.

The main memory section D comprises the 2D memory and also the 3D memory together with the various registers and automatic clocking mechanisms and are quite conventional in their organization and operation. The operation of such memories is very well known in the art and a detailed description of all facets of such operation will not be attempted. A specific description of the operation of the 3D memory section keyed to the timing chart of FIGURE 6 is included as a general background of such operation. The description of FIGURE 3 will make it apparent how the addresses for the 2D and 3D memory are derived in general logical block form and it is believed that this description will quite adequately describe the operation of the invention.

The memory disclosed and described in this embodiment of the invention is a magnetic core storage type of memory; however, it is to be understood that other types of 2 and 3 dimensional memories could equally well be used in practicing the present invention. For purposes of subsequent description it will be assumed that the 3D portion of memory is 128×128 bits in the X and Y directions and is 64 bits deep, thus allowing 8 bit characters and 8 character words as described previously. The special core planes as set forth in the present embodiment are likewise 128×128 in the X, Y direction, thus having a possible binary bit position for each machine 64 machine word in the associated main memory. In the embodiment of the invention disclosed in the drawing of FIGURE 3 in the specification, the special core planes are shown located directly above the 3D portion of the memory and it is believed that this would be the most convenient type of an arrangement for making such a memory; however, it is to be understood that the special core planes could be located remotely from main memory, the only requirement being that addresses determined for one have a 1 to 1 correspondence for addresses determined for the other.

Sections A, B, C and D comprise that portion of the system necessary to input data into the main memory in accordance with the general hierarchical pattern as illustrated in Table I. This input is done completely automatically without necessitating any control on the part of the machine operator.

Sections D, E, F, G and H comprise the search portion of the instant invention and include circuitry for automatically searching the hierarchical memory organization which has been achieved by the input section.

As will be well understood by a person skilled in the art, much of the circuitry of Section D which comprise the main memory, address registers, drive rings, decoders, etc., will be common to both the input and the search procedures. The following specific descriptions of FIGURE 3 and also of the search and input examples keyed into the composite diagram of FIGURES 2*a*–2*b* will clearly indicate which major functional portions of the memory section D are utilized for both input and search procedures.

Section E comprises a plurality of registers and flipflops which received information from the program which indicate what is to be searched for in main memory. As will be described more fully subsequently, this search data begins with an initial or starting address and from there indicates which of the level marks starting at this address are to be located in the main memory. The information from Section E is read a step at a time to the "Level Search Ring" Section F.

Section F comprises a search ring and appropriate controls necessary for gating information or data from one of the special 2D core planes at a time. The circuitry of this Section goes through the information stored in the special core planes and counts until a particular bit in this core plane is found. When a given bit is found, it is either placed in the special "Storage Registers" of Section H or the next step in the search sequence is requested from Section E depending upon the search instruction.

The functions of Sections E, F and H are controlled again by a clock indicated by Section G and entitled, "The Search Clock." This clock is quite similar to the "Input Clock" Section C, and controls and synchronizes the various operations of the search procedure to accomplish a routine and orderly search of the data to find the desired address of the data in storage as stipulated by the search program.

It will thus be seen that the present system may be logically broken down into two portions, namely the input portion and the search portion.

Referring now to FIGURES 2*a*–2*h*, a general description of this logical schematic diagram of the necessary control circuitry registers and so forth, will follow. When referring to the composite logical schematic of FIGS. 2*a*–2*h* references will simply be made to FIG. 2 subsequently in the specification.

Figures 2, 2A:
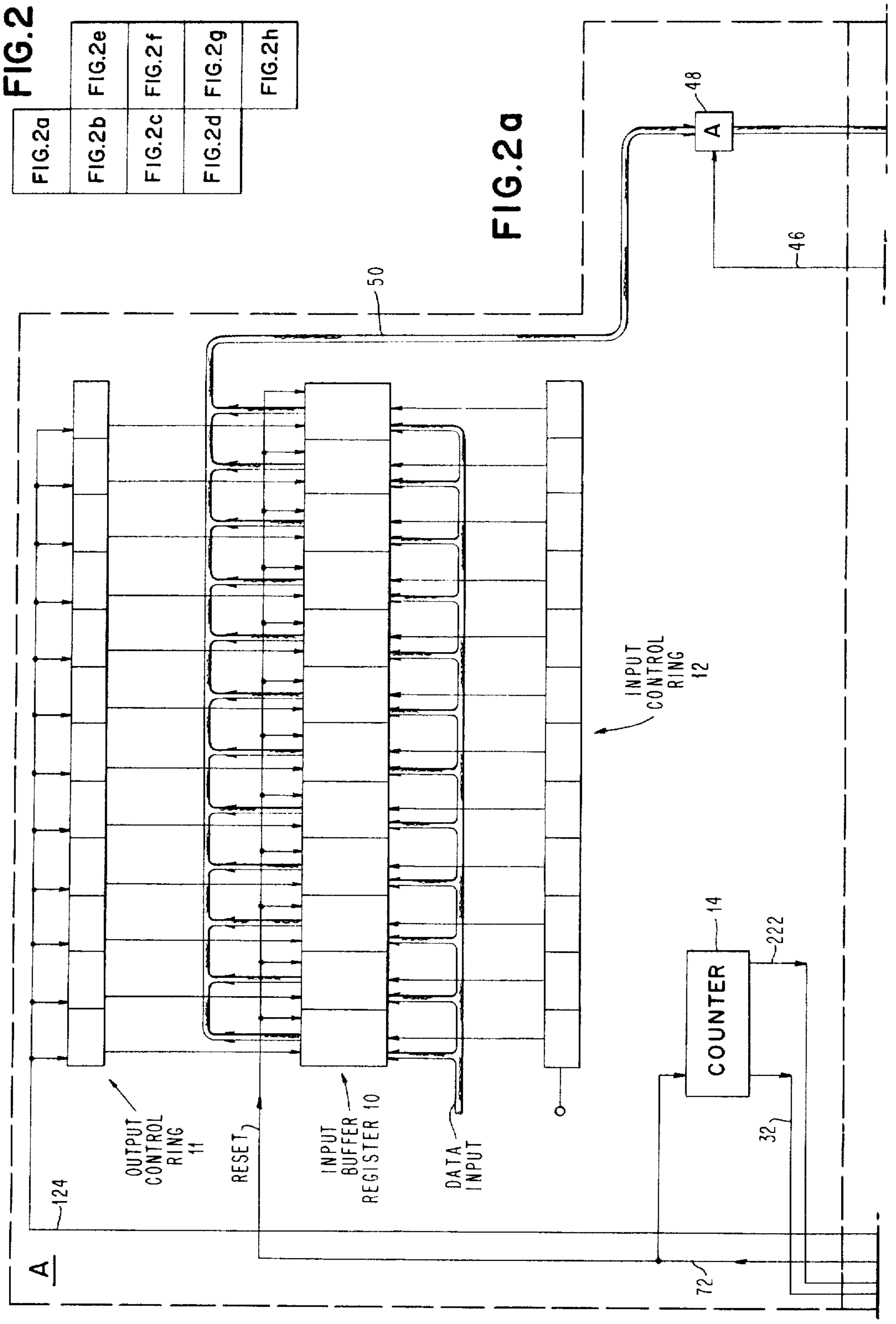
FIGURE 2 is an assembly diagram of FIGS. 2*a*–2*h*.
Figure 2B:
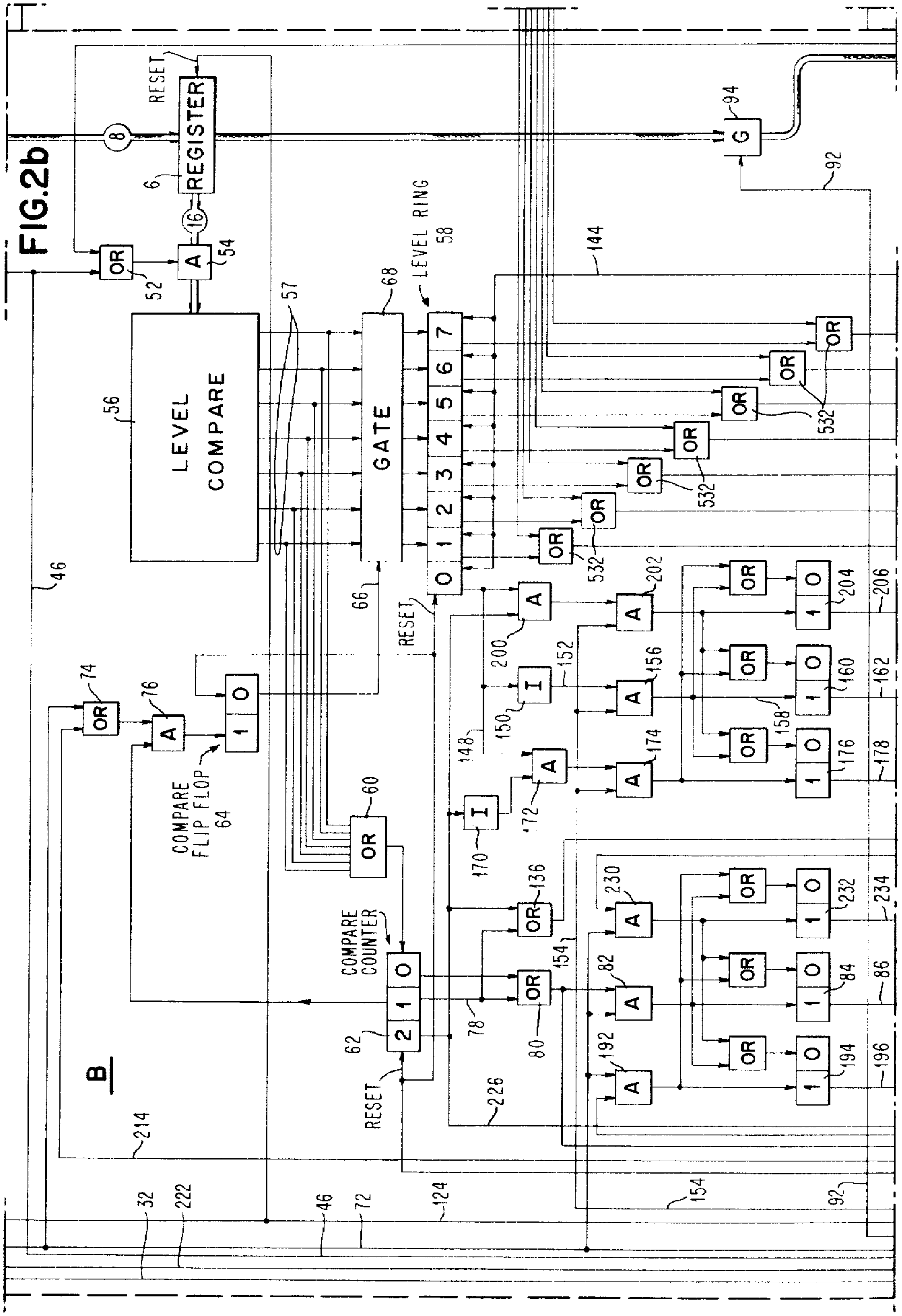
Figure 2C:
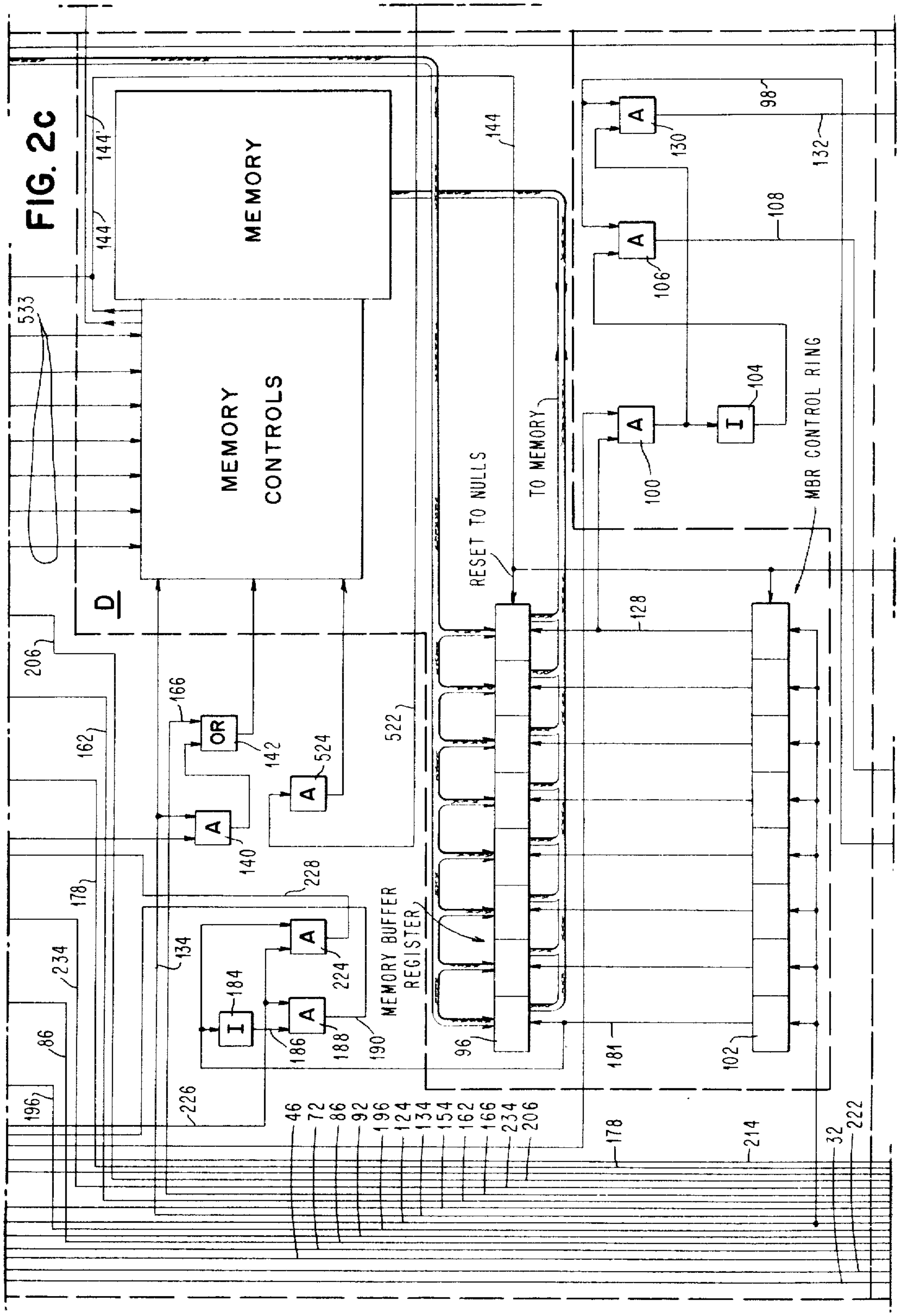
Figure 2D:
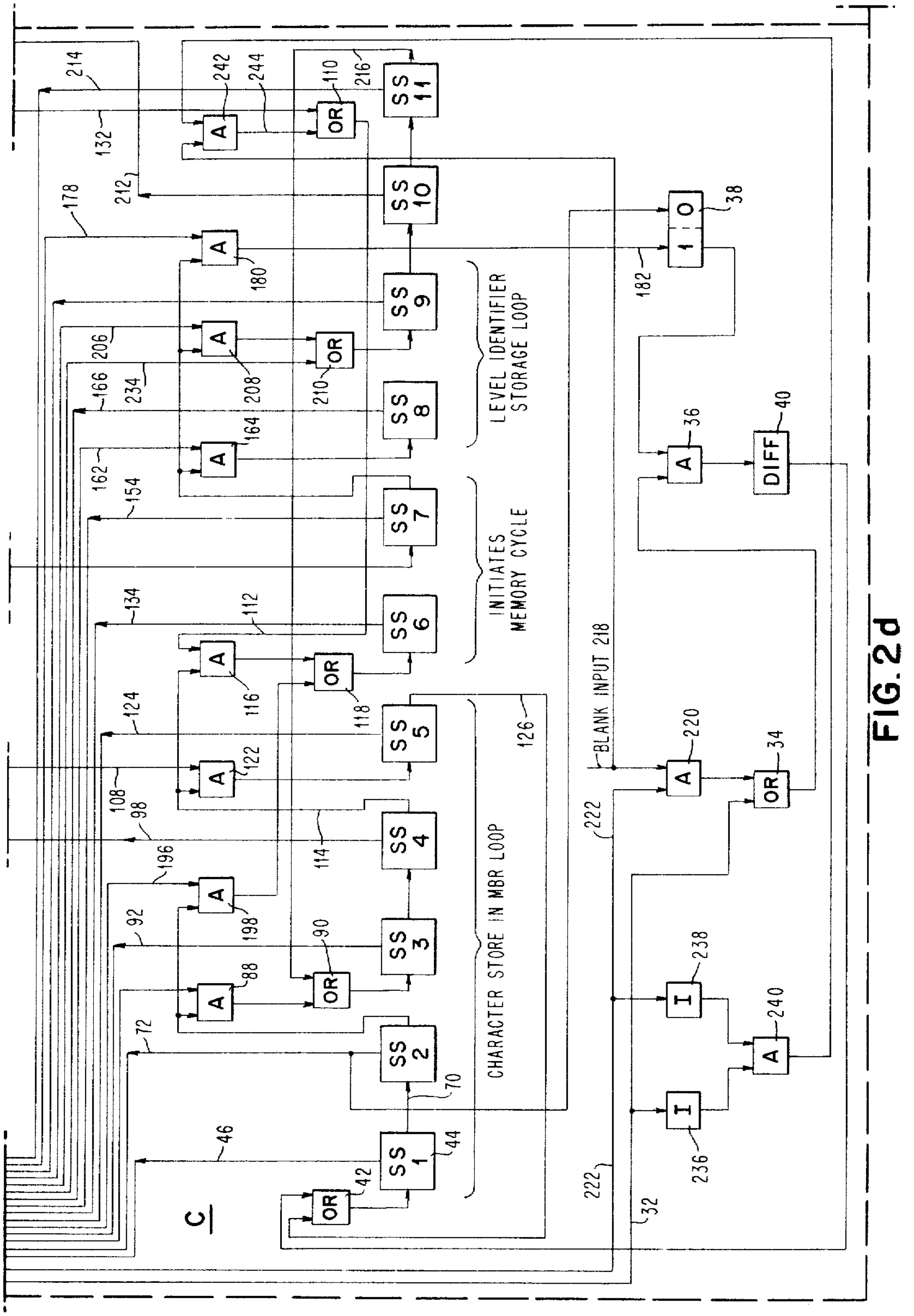
Figure 2E:
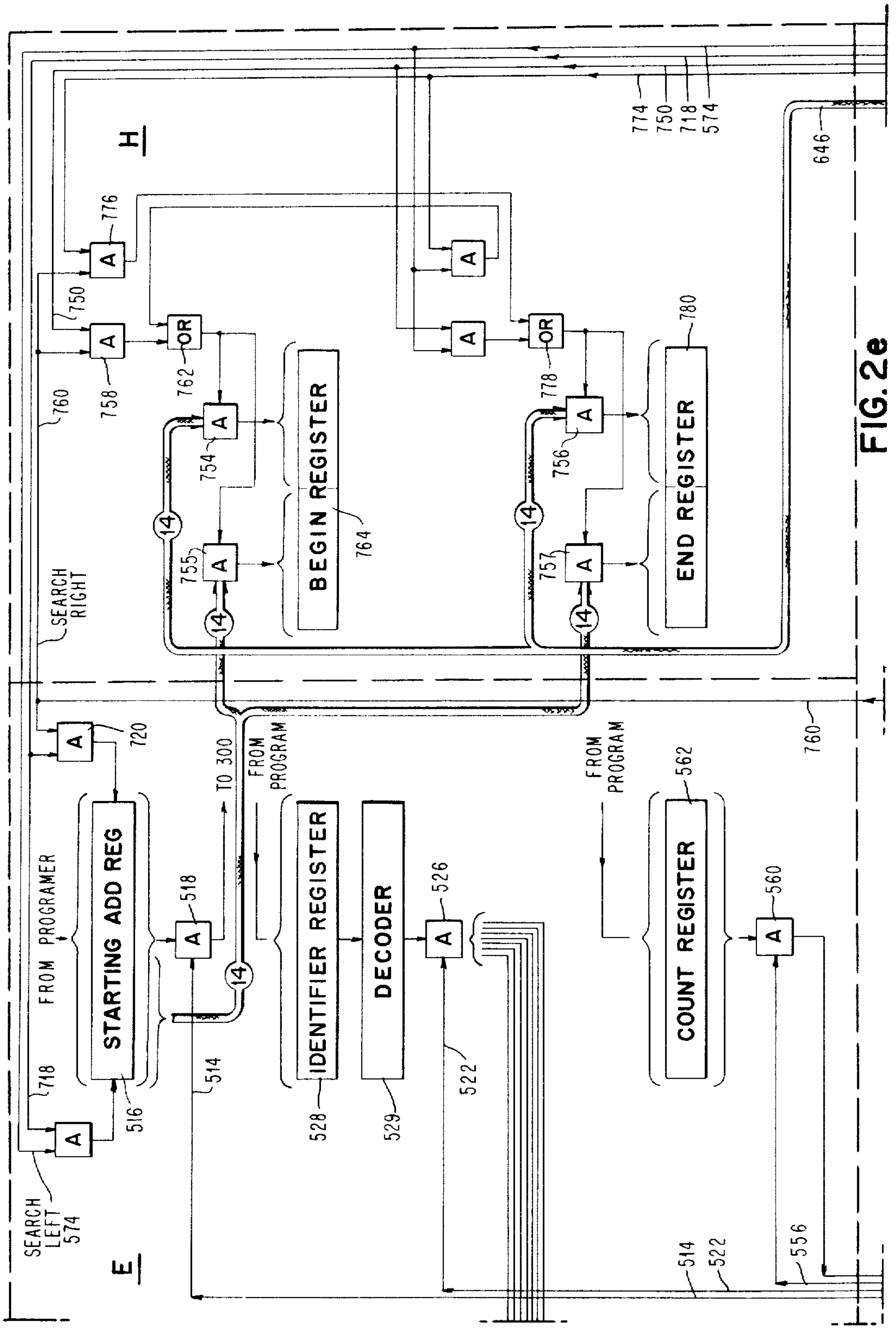
Figure 2F:
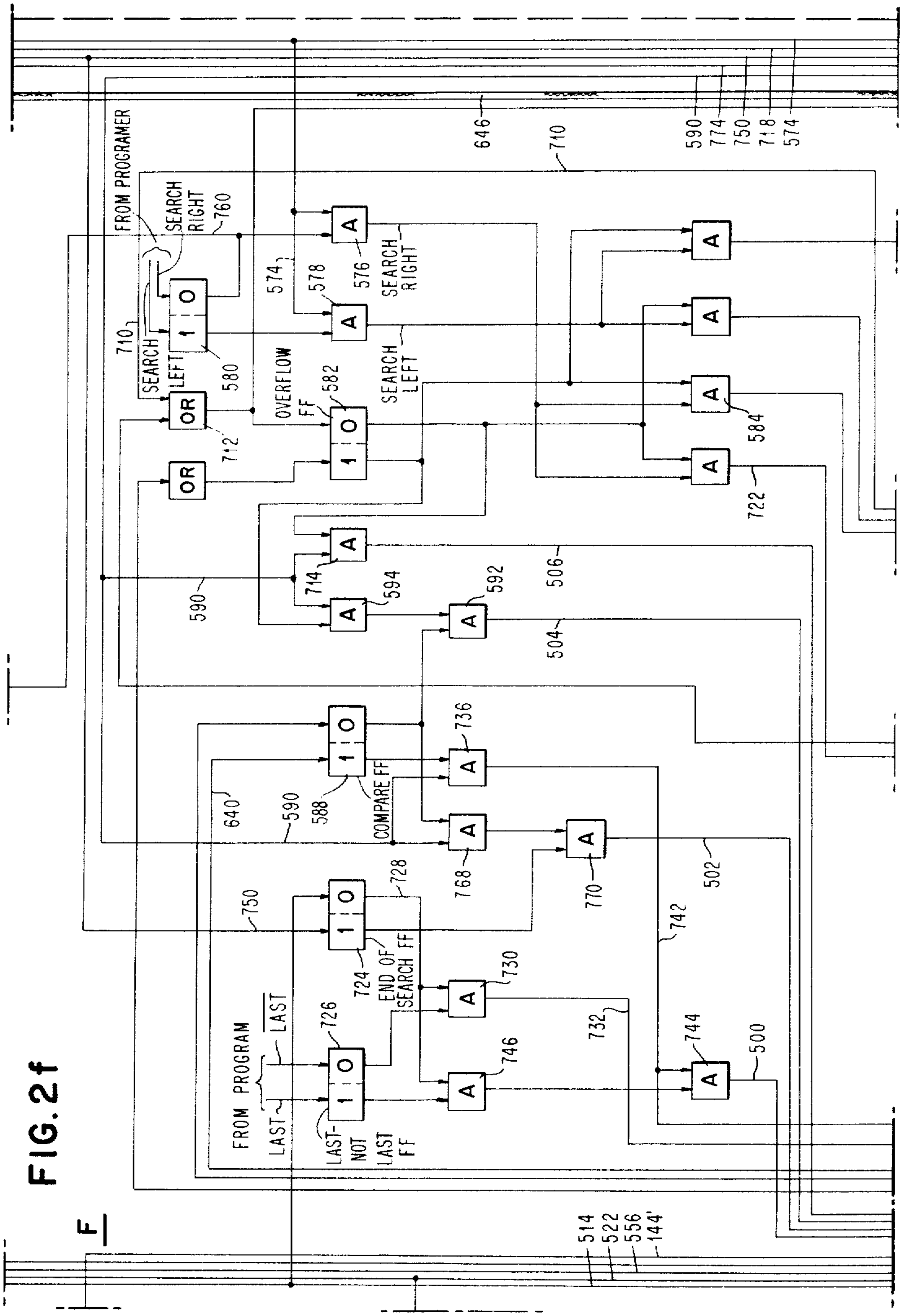

FIGURE 2 itself is an organizational diagram of the individual components of FIGURES 2*a*–2*h* making up this over-all diagram. As stated previously, its circuit is shown in logical schematic form, all of the individual blocks shown being conventional circuits well known in the computer art. It is the specific organization and interconnection of the circuits which constitute the present invention.

It will be noticed in this drawing that FIGURE 2 is broken up by dotted lines into major Sections A-H which correspond to the Sections A-H of the over-all block diagram of FIGURE 1.

Referring now to Section A of FIGURE 2, the input buffer for the system is shown in block diagram form. The actual buffer storage Section 10 comprises a plurality of latches such as shown in, "Arithmetic Operations in Digital Computers," by R. K. Richards, D. Van Nostrand, Inc. New York, FIGURES 2–14*a*. It will be seen that there are twelve stages or blocks in this input buffer register which means that up to 12 characters can be stored therein at any one time. It should be noted that although 12 has been found to be a convenient number to give satisfactory flexibility to the system that any number of stages desired could be used depending on the particular input medium, such as paper tape or magnetic tape, which is employed as the data input source. The input buffer 10 is controlled by the input control ring 12 and the output control ring 11 which determines the particular stage of the buffer 10 into which information is being stored and from which information is being taken, respectively.

Information is allowed to be entered into the input buffer stages 10 under control of the input medium which, as stated previously, may be a magnetic or paper tape, magnetic drum, etc. As each character is available on the input buss, an input advance pulse also supplied with the input data as a marked pulse or the like will cause the input control ring to be stepped to the next position so that the characters are gated into successive positions of the register 10. The input and output control rings are conventional stepping rings such as shown in the before referenced Richards' textbook, FIGURES 7–13(a). As stated above, the actual number of positions of the buffer register of the input buffer register 10 may be changed, the only requirement being that it be large enough to hold enough information so that one memory word can be loaded into the memory buffer register without having to wait for the input to catch up and also, that there be a continuously available blank input position so that the input is not held up by the output speed. As a practical matter, the output from the input buffer register 10 is so much faster than conventional mechanical input systems that this latter restriction is never a problem.

Counter 14 is provided to prevent an output from the register 10 until at least 8 characters are stored in the input buffer. This figure is chosen since the memory buffer register and the main memory itself is set up to receive 8 characters for a machine word and the efficiency of the system chronologically is greatly enhanced if it is insured that at least a machine word is available in the input register before the comparing, outputting and subsequent storing operations are begun. If a 5-position memory buffer register and machine word organization were used, a counter producing an output at a count of 5 would be used at 14. It will be apparent again that using such a counter is not absolutely necessary nor is the provision of any particular count level before an output operation will be initiated. The counter 14 is again a conventional counting register such as disclosed in the before referenced Richards' textbook FIGURES 7–1.

While describing the input buffer register 10 attention is directed to FIGURE 4 which is a more detailed logical schematic diagram of a single stage of the input buffer register. While a more complete description of this and various other types of registers is referred to above, the following explanation briefly describes the operation of such a register stage.

The register stage comprises 8 flip-flop circuits 10*a*, 8 being required because an 8 bit binary code is used. Incoming data enters the stage on the 8 conductor input line 10*b*. Assuming that this stage is now active, a pulse is produced by the input control ring on the cable provided therefor which activates the gate circuits 10*c* and allows the input data to set the flip-flops to the 1 position in accordance with the particular input signal on the lines. As will be noted, an 8 conductor input cable is utilized, thus, a signal will appear on only those cables where a 1 forms a portion of the binary code; for such cables as are inactive, on which no signal appears, those flip-flops will remain reset in their 0 positions. It will be noted that a reset pulse is provided for the stage of the registers and sets gate circuits 10*d* together with an output from the output control ring 11 from a previous cycle. Assuming now that input data is stored in the flip-flops 10*a* and their signal is received from the output control ring to output such data into the compare circuitry the gate circuits 10*e* will be actuated by such signal and an output will appear on line 50. As will be noted, a 16 conductor cable is utilized in the output so that for each bit position, the 1 or 0 cable will be brought up. It will be apparent to one skilled in the art that an 8 conductor output cable could also be used wherein only active 1's would have a signal; however, this particular 16 conductor cable is compatible with the particular block diagram compare circuitry shown in FIGURE 5 and is intended only to illustrate an operative embodiment of the invention.

Returning to FIGURE 2, Section B thereof comprises the level comparison and control circuits which are responsible for examining the input data from the input buffer register 10 in accordance with the data organization rules of the present invention set forth previously. Actually, this section operates or functions in conjunction with Section C which is indicated as the Input Clock to (a) Examine each character to determine whether or not it is a level identifier, (b) Initiate a memory cycle when 8 characters are stored in the buffer register 96, (c) Detect a second level identifier and prevent storage thereof in the memory buffer register in any but the proper position, (d) Detect the end of a data sequence and (e) Provide for the insertion or placing of the proper level identifier marks in the special core planes of the auxiliary 2D memory.

As stated previously, the operation of the specific circuitry disclosed in FIGURE 2 will best be understood in detail from the specific description of an operating example for both input and storage set forth subsequently in the specification, together with the timing table provided therewith. The examples provided have been selected to set forth a representative illustration of every significant data input situation which would normally occur in an input data string. A similar selected illustration has been employed for the search example.

One of the more significant functional elements of Sections C and D of FIGURE 2 is the level compare circuitry in which each incoming character is compared with the 7 level identifiers in parallel. The compare flip-flop 64 is to prevent the gating of more than 1 level identifier in any one machine word and its operation will of course be described in detail in the subsequent example. The compare counter 62 operates in conjunction with the compare flip-flop to determine the number of level identifiers which have been encountered in a data string insofar as it will affect the storage of such identifier in the memory buffer register and also its position in the machine word.

All of the AND gates, OR gates inverters and flip-flops disclosed in block form in the figures are believed to be so well known in the art, that they do not require specific references. It being generally stated that any of a very large number of textbooks may be referred to for a specific implementation of such circuits. One such book is, "Arithmetic Operations in Digital Computers," by R. K. Richards, D. Van Nostrand Co., Inc., New York.

The memory buffer register 96 is again a conventional magnetic memory buffer register. The position of the register into which succeeding binary characters will be placed is controlled by the control ring 102 which is also conventional with such registers. Input data is gated into the memory buffer register from register 6 under control of the compare circuitry.

When a successful compare is made in the compare circuitry, one of the lines 57 will become active and when gated through gate 68 under the control of the compare flip-flop 64 will set one of the positions of the level ring 58, as will be explained later in the example, this level ring controls the highest position for a particular machine word in which a level mark will be placed in the special core planes and controls the subsequent insertion of such level marks and the corresponding positions in the lower order special core planes. The ring itself is a decrementing counter and is again a well known circuit in the art, a specific reference being made to the before referenced Richards textbook, FIGURES 7–13.

The Input Clock C is a conventional single shot multivibrator flip-flop arrangement interconnected as shown in the diagram and is basically a very conventional clock arrangement as used in many synchronous systems. While the specific operations of the individual members of the clock will be set forth subsequently in the example, stages 1–5 essentially control the storage of succeeding characters in the memory buffer register and thus constitute a loop which will be continuous until a second level identifier is detected in a string or until 8 characters are stored in the memory buffer register, in which latter case, stage 6 of the input clock takes over and initiates a storage cycle. Stages 7 and 8 of the clock control the storage of marks in the special core planes and cause the stepping down of the level ring 58 as a mark is put in each subsequent level until all such marks are inserted, as again will be set forth specifically in the operating example.

While describing the level compare circuit 56, attention is directed to FIGURE 5 for a more detailed showing. It will be noted that an 8 input AND gate is provided for each of the level identifiers, an input from the 0 and 1 lines of the 16 conductor input cable from register 6 being connected to appropriate inputs of the AND circuits in accordance with the particular character being checked. Whenever all 8 inputs on a line come up into any one of the AND gates, a "Compare" output will appear on the single output from the AND gate. The 7 output shown correspond to the output lines 57 coming from the bottom of the level compare circuit 56. FIGURE 5*a* shows the details of conventional flip-flop type circuits which would make up each of the large blocked AND gates of FIGURE 5. The connection of the various input lines to the desired side of the flip-flops is clearly indicated in this figure. It is, of course, to be understood that a reset pulse would be supplied to all of the flip-flops in all of the compare circuits at the end of each compare cycle for obvious reasons.

Section D may best be described by first referring to FIGURE 3 which is a logical schematic diagram in functional block form of that portion of FIGURE 2 designated by the letter D and entitled, Memory Controls and Memory. This section comprises the main memory 900 and the auxiliary memory 901, which for purposes of the preferred embodiment is shown to be a set of 2D memory planes each of which is adapted to store different level identifiers or hierarchical marks as set forth previously. It will be noted that only the lower three planes of such a 2D memory are shown and are indicated with the particular level identifiers, i.e., ①, ② and ③ which they represent. The figure further shows the principal memory address register 300 from which the address for any read-write operations for both the 3D and the 2D auxiliary memory are obtained as is well understood in the art. Also shown are the various decode matrices and core drivers for driving both the X and Y lines in the main or 3D memory. Additionally described are the means for deriving the drive selection and control for the 2D portion of the memory also from the main memory address register 300 as well as the separate means for writing a single bit of information into the 2D memory on the input cycle and reading a complete line from the 2D portion of memory on the search cycle as will be explained more fully subsequently. The memory buffer register 96 shown in the figure is the same memory buffer register shown by the numeral 96 in FIGURE 2. As will be well understood by a person skilled in the art, this register may be utilized both for gating information into or out of the main memory 900. Register 312 which is a 128 bit register receives the information gated out of the 2D memory planes 902, 904, 906, etc. The binary information in this register is gated upon command to the register 610 of the search circuitry whose operation is explained subsequently.

To store information in the system, the address for insertion of a bit of information is first put in the main memory address register 300. This address may be obtained from an auxiliary location as indicated by the block 301 entitled "availability list" which may simply be an incrementing counter which will start in the word position zero in main memory and index through the full 16,784 words shown in the 128 x 128 main memory array. This type of data storage assignment system is well known in the art and quite conventional.

Assuming that an address is in the register 300 and a machine word is in the memory buffer register 96 ready for storage, the "X" portion of the address is decoded through decode matrices 540 and 542 and gated through gates 546 and 544 into the 8 x 16 core driver array 543 which places a half-select pulse on a selected "X" line in main memory as is well understood in the art. At the same time, the "Y" portion of the address in register 300 is decoded by matrix 541 and its associated gate elements to drive the 8 x 16 "Y" core driver array 549 which energizes a selected "Y" line in the 3D memory 900 with a half-select pulse. Thus, a machine word is selected in accordance with the particular "X" and "Y" lines addressed and the particular data or machine word it is desired to write is gated from the memory buffer register 96 by gate 908 and drives selected numbers of the inhibit drivers 910 in accordance with the machine word stored in the memory buffer register.

Concurrently, with the writing of a machine word from memory buffer 96 in main memory 900 a bit or 1 will be placed in the corresponding position of the level identifier planes 902, 904 and 906, etc. To accomplish this a half-select pulse is put on the particular "X" and "Y" drive lines in the identifier plane which has been selected. The writing of said bit in the 2D portion 901 of memory in an address corresponding to that of the machine word in main memory 900 is accomplished as follows:

The "X" portion of the address in memory address register 300 is transmitted on line 912 through the 2D memory decode matrix 914 and gated through gate 916 into the write driver matrix 918. One of the output lines in buss 920 will be provided with a half-select pulse in accordance with the "X" address from the "X" portion of memory address register 300. The particular level plane into which this half-select pulse is gated is determined by gates 922, 924, and 926, etc. which are under the control of the level ring 58 of FIGURE 2 as was explained previously. Concurrently, with the application of the half-select pulse to a particular one of the "X" lines of one of the level planes, the "Y" portion of the address of memory address register 300 is decoded in decorder 310 and gated into driver matrix 552 which will bring up one of 128 "Y" drive lines in accordance with a particular "Y" address in the memory address register 300. Driver 552 likewise provides a half-select pulse which will be gated into a selected one of the level identifier planes by means of gates 928, 930, 932, etc., again under the control of the level ring 58 as explained previously. Thus, it will be seen that when a machine word is stored in the 3D memory 900 a bit is written into the special level identifier planes 902, 904, 906 of 2D memory 901 concurrently therewith and at the same address as in the main memory. Level identifier marks will also be written into the same location of all the lower level planes associated with such a machine word. In other words, the same address in memory address register 300 is used to store the bits sequentially in the lower order planes of 2D memory 901 in exactly the same manner as described above except that the level ring 58 will automatically gate the select pulses into the subsequent ones of the identifier planes until the level ring 58 is in the zero position. A detailed description of this operation appears in the subsequent input example.

In the search sequence, the reading out of a line of information from a particular level identifier plane and the development of a "begin" and "end" address for a desired string of information constitutes the inventive feature of the search operation since the actual reading out of a word or words from the main memory 900 is completely conventional. The unique feature of this portion of the system resides in the manner in which the address for the particular data string to be read out is obtained by using the special level identifier planes. A detailed description of the method by which a line of data from one of the identifier planes will be utilized is explained subsequently both in the general description of section F of FIGURE 2 and in the particular search example set forth.

It is required by the system that the search begin at a particular place or address in memory as determined by the "program" search instruction, this beginning search location in memory will be gated to the memory address register 300. As explained in more detail subsequently, it is desired to read out the entire X line in which this starting address is contained, therefore the X address portion from register 300 is transmitted over line 912 through the decode matrix 914 and this time is gated through gate circuit 934 to the driver matrix 936. Matrix 936 is what is known in the art as a "full select" driver matrix. In other words, it will provide a pulse sufficient in and of itself to cause a switching of the cores without a coincident pulse on the Y drive line. Such operation is likewise well known in the art and will not be described in further detail. For a more complete description of the operation of 2D memories using both coincident current half-select pulses or single full select pulses reference is made to the book, "Digital Computers," by R. K. Richards, D. Van Nostrand Co. in the chapter entitled, "Magnetic Core Storage." In a manner similar to that described for the input operation one of the 128 lines in buss 920 is activated by the driver matrix 936 and this current is gated into one of the level planes 902, 904, 906, etc., in accordance with the particular gate 922, 924, 926, etc., determined from the search program and stored in register 528. When the full select pulse from driver matrix 936 is applied to, for example, level plane 902 for the ① level through gate 922, the entire X line selected will be read out on the Y lines into buss 938, which it will be noted serve as sense windings in the read portion and half-select write windings during the input or write portion of the 2D memory cycle of operation. All of the 128 lines of buss 938 are gated through gates 304 and 538 through an appropriate sense amplifier 940 into the register 312. Thus, the contents of the particular "X" line selected and the particular plane selected are stored in the 128 bit register 312 and may be gated through gate circuit 314 to register 610 of the search ring circuitry.

The auxiliary or 2D memory planes 902, 904, 906, etc., are conventional 2D core arrays wherein each "X" and "Y" line is separately addressable as set forth above. As will be noted in the drawing, one end of the "X" and "Y" lines is grounded and the other connected as desired to the various driver matrices through appropriate gating circuits. As will be seen from the above description, it is possible to write individual bits of binary information into the 2D memory and read information out a line at a time as is required by the search organization.

This 2D portion of memory 901 has been presented as a preferred embodiment of the invention in that it may be readily seen how the X and Y addresess are taken from the main memory address register 300 and utilized directly through appropriate decoding matrices and driver arrays to select particular positions in said 2D memory directly corresponding with the position in which a machine word is located or stored in the main memory. However, it is to be understood that this is a description of a preferred embodiment and that other more complicated memory systems could be used, if desired, having appropriate decoding matrices and drivers for selecting a position in said auxiliary memory whose address corresponds unambiguously to particular address in the main memory.

The main memory 900 and its associated control circuitry is a highly conventional 3D word organized memory containing "X" and "Y" windings sense and inhibit windings so organized that a machine word may be written into or read out of the main memory selecting the desired "X" and "Y" drivers in the read operation and selected "X," "Y" drive and inhibit drivers in the write operation. The operation of such a word organized core memory is well known in the art and is incorporated in a large number of present day commercial computers. A complete description of such a 3D memory may be found in the above cited book and chapter of R. K. Richards; the article, "Computer Memories: A Survey of the State of the Art," by A Rajchman, page 104 of Proceedings of the IRE, January 1961, vol. 49, No. 1; the article, "A 32,000-Word Magnetic-Core Memory," by Foss and Partridge, page 102 in the IBM Journal of Research and Development, vol. 1, No. 2, April 1957; The IBM 704 and 705 Customer Engineering Reference Manual; The IBM Customer Engineering Manual for the 7302 Core Storage Unit.

Similarly, specific descriptions of the memory address registers, decode matrices, core driver arrays, etc., disclosed in block diagram form in FIGURES 2 and 3 may be found in the above references.

For ease in understanding the operation of the instant system the following is a very general description of how a typical 3D memory operates with reference to the conventional timing chart of FIG. 6.

The ultimate storage unit in such a magnetic memory is a small ferrite toroid or magnetic core which when magnetized retains its magnetism in one of two possible states. The ability of the core to retain the magnetism allows the core to remember. The core is magnetized by driving current in wires passing through the core. Such cores are switched from one state to the other by applying a positive critical magnetomotive force $H_c$ or a negative magnetomotive force $-H_c$ to the element. In the memory system these M.M.F.'s are produced by the driving currents in the wires or drive lines passing through such cores.

For use in large word organized three dimensional memories where large numbers of ferrite cores are to be used, it is essential that the magnetic material have a substantially square hysteresis curve. With such system-, coincident current switching is utilized and it is essential the M.M.F.'s of $H_c/2$ or $-H_c/2$ have little effect on the flux density or residual state of the core when occuring by itself. In such a system, it is obviously necessary that the ability to operate the memory properly necessitate the core being able to distinguish between an $H_c/2$ and a full $H_c$ drive. Such cores are widely available today.

Assuming a 6 x 6 rectangular matrix of such cores arrange in X rows and Y columns at right angles to each other a single core of the matrix is selected in the following manner. A half select current pulse sufficient to produce an M.M.F. of $H_c/2$ in each core is passed through one X line and one Y line and will produce a field of $H_c/2$ in eleven of the cores but will produce a field of $H_c$ in the core at the intersection of the X and Y lines. Thus, by energizing one X and one Y line, any one of the thirty-six cores may be switched. It is, of course, obvious that if a core is already in a "1" state or that which a positive $H_c$ would produce, it cannot switch but will remain in the "1" state. This is the principle by which many such magnetic memories operate.

In the conventional 3D word organized memory set forth in the present invention, a very large number of such cores are utilized to make up a plurality of core planes. Each plane is described as having 128 x 128 or 16384 cores. The memory described herein utilizes 64 such planes, thus, constituting a machine word having 64 bit positions or 8 characters, each having 8 bits. Since any one of these 64 cores may be considered as a binary "0" or binary "1" the word then consists of 64 binary "1's" or "0's."

It should be here noted that the three dimensional array is conventionally wound in the following manner, assuming as above individual 128 x 128 planes, 64 planes deep. There will be 128 X windings each winding threading continuously through the same line position through all the 64 core planes appropriately terminated at one end and connected to driving means at the other. At right angles to the X lines and 128 Y drive lines each line again threading through all 64 planes through the proper Y position and being terminated and driven as above. Since in any given read or write operation only one 64 bit word will be activated by any one X, Y address, i.e., one core in each plane, the sense windings are arranged so that a common sense line threads all of the cores in any given plane. Each of these sense windings is brought through its respective sense amplifier into the proper position in the 64 bit position input-output register 96. During the write operation, since each of the cores tends to be switched to its binary "1" state by a half-select pulse of the X, Y drive windings producing a full select pulse $H_c$ in all 64 cores of the machine word it is necessary to prevent certain of these cores from switching to the "1" state in accordance with the data in the input-output register which it is desired to write into the memory. This is accomplished by inhibit or Z windings which are common to the individual planes and which are driven with sufficient current to produce a magnetomotive force of approximately $H_c/2$ and thus preventing the core from being switched from its binary "0" to its binary "1" state.

Each word in storage is assigned an address or identifying number which designates its location in the storage unit. The 16384 words in the present storage unit may be designated by the numbers 0, 1, 2, . . . 16383.

Reading a word from core storage is accomplished in general by first setting all the cores of the addressed word to zero. Any core that was previously in a one status causes a voltage pulse to appear on the sense winding which passes through all cores. The voltage pulse is amplified and fed into an output register. A regeneration or rewrite cycle is then executed. This cycle takes the information from the output register and writes it back into the cores, permitting the information from a particular address to be used on subsequent cycles.

To write a word into core storage, it being assumed that the cores in the addressed word have been previously set to zero. The write cycle then feeds the information to the cores of the preselected address via Z or inhibit windings as set forth above from the associated memory buffer register, i.e., register 96 of FIGURE 3.

The above is a general description of the manner in which binary information is read out of and written into a conventional three dimensional word organized desctructive read out core storage unit. While other methods are sometimes used, this particular system is quite conventional and appears in a great many commercial machines. The following is a general description of the logic circuitry and the controls necessary for addressing the memory, properly driving the memory on read and write instructions and for generally controlling the sequence of the operations within such a memory.

The functions required of the addressing circuits are the following: The $n$-bit address ($n=14$ for a 16384 word 128 x 128 3D memory matrix) stored in the memory address register must be decoded. In the present coincident current memory system two 7 bit decoders are required. Two sets of $2^n/2$ outputs of the decoders are used to drive the rows and columns of the core arrays or the X, Y drive lines of said core arrays. Positive and negative pulses are required for the read and write cycles respectively. This is because with the ordinary operating procedure described previously the directions of current in the X and Y drive lines must be opposite for reading and writing. The inhibit or Z drive winding requires only a unidirectional current since it supplied an M.M.F. of $H_c/2$ when writing a zero and no M.M.F. when writing a one or vice-versa depending upon the particular system used.

The addressing circuitry for such a 3D word organized memory must, of course, be able to select any one of the 16384 words used in the present 128 x 128 64 plane 3D memory. To do this, a 14 position memory address register shown as 300 in FIGURE 3 is utilized to produce the address for a particular word in memory. As will be readily understood, this 14 bit register is capable of 16384 combinations which can be decoded through proper decoding matrices as will be explained subsequently. Seven of the bits of the 14 bit address register are utilized to determine the X address and the other seven bits, the Y address. This is likewise clearly shown in FIGURE 3. Conventionally, such an address register has associated therewith an incrementing or decrementing counter which starting with an original address in the register will cause said register to increment one position at a time through memory upon each storage cycle. This is the standard system utilized in a conventional inputing system where a certain segment of such a memory is assigned for a given problem. In such a case, the first position of said segment of available storage locations is placed in the memory address register and subsequent machine words are automatically fed into adjacent locations upon command of the self-incrementing address register. Of course, on read out operations it is to be understood that a specific address would be fed to the register from a program source and the read out operation carried out in accordance with such address.

As stated above, the 14 bit total memory address is decoded seven bits at a time in the X and Y decoding sections. These decoding systems may take any one of many forms including electron tubes, transistors and various types of magnetic core circuits. For the general system to be described herein, it will be assumed that the decode matrix is a standard set of transistors having relatively low power output which must be amplified by suitable amplifiers or driver circuits and subsequently fed to a pulse transformer array or the core driver array as it is usually referred to in the art and subsequently to the individual X and Y drive lines selected in accordance with the address.

The core driver matrix or array is a conventional method of driving large numbers of core sin a memory matrix. They are actually very similar to the individual memory cores themselves in that they have a square hysteresis loop and are bistable. They possess a further advantage in that they can be arranged in an array in a manner similar to that used for the main storage section and although 128 core drivers will be necessary to drive 128 X or Y lines they may be arranged in, for example, an 8 x 16 array and will thus necessitate only 24 driving circuits which are selected in accordance with the output of the decoders. The 8 x 16 core driver array shown in FIGURE 3 is again quite conventional and is further convenient since the address for the 8 input portion may be conveniently decoded from the first three bits of the X or Y address and the 16 input portion from the latter or second 4 bit address for the X or Y portion of the main memory address. It is for this reason, for the sake of clarity, that the X and Y decoders 540 and 541 are shown schematically in two sections as they actually break up the address into the two discrete portions to drive the core driver array. Since each of the X and Y drive lines must be able to produce pulses of $H_c/2$ of both the positive and negative value, the output of the pulse transformers or cores of the core array must be capable of being driven in opposite directions by its associated drivers. This is conventionally accomplished by feeding the output of the decode matrix into one of two sets of drivers, each of which is connected to different windings on the cores of the core array which produce opposite polarity pulses in the output winding which feeds the individual X and Y drive lines. Which set of drivers is selected, i.e., read or write, is determined by the main memory timing circuits or clock.

In summary, the manner in which a particular word location is addressed includes the following steps, the main address for the word to be brought out of or read into memory is placed in the memory address register, the address is decoded in the X and Y decoding matrices, the output of the decoding matrices is amplified in the driver circuitry and the driver circuitry is utilized to select particular cores of the X and Y core driver arrays to produce coincident current pulses on selected X and Y drive lines in the main memory. This pulse appearing on the X, Y drive line causes all cores at that particular address, i.e., 64 in number to be switched in their one or their zero states and accordingly, any core which was previously in the opposite state will produce a pulse in its associated sense winding as it changes states on its hysteresis loop. This output pulse is brought out on the individual sense lines for each of the 64 planes and is stored as a one in the associated position in the memory buffer register, i.e., 96 after passing through suitable gating circuits and sense amplifiers.

As stated previously, in a conventional read write cycle, after the reading operation, the write cycle automatically follows and the word read out of the memory will automatically be replaced in the memory in order to preserve the data contained therein for future reference. It will, of course, be understood that if it is desired to completely erase the word from that position in storage, the memory buffer register may be set to all zeros by well known means so that nothing will be written back into the main memory on the write cycle.

As discussed previously, in order to specifically write binary information into a memory location in accordance with binary data in the memory buffer register, means must be provided for supplying an $H_c/2$ pulse to the Z or inhibit windings passing through each plane so that at the appropriate places the writing of a binary "1" in the cores may be prohibited or inhibited during the write portion of the memory cycle. This is accomplished by a series of inhibit drivers which may for the sake of simplicity be considered as 64 separate drivers or amplifiers whose outputs are brought up in accordance with the appearance of a one or a zero in the associated position of the memory buffer register. The output pulse of the inhibit driver circuit is, of course, chosen to be sufficient to produce an M.M.F. of $H_c/2$ in the inhibit drive winding. Since the polarity of the inhibit drive is always the same, i.e., to cancel out half of the coincident current produced $H_c$ for writing a "1" only one driver is required for each plane.

As a practical matter, it is to be understood that for both the inhibit and sense windings due to noise and various other considerations caused by the magnetic circuitry both of these windings are often broken up into sections and read out or driven in parallel so that fewer winding will have to be driven in series. However, this operation is essentially the same and identical functionally to that described herein.

It is believed that the above description, while very general, clearly indicates the manner in which a typical three dimensional word organized core memory operates. Timing circuits are used to control all of the above operations of such a memory in proper sequence and time. Such units are usually asynchronous because they initiate all of their own timing pulses.

Any core storage operation must be started by a selected signal supplied to the particular core storage unit. A signal appearing on what is conventionally known as a "memory select line" is the basis for all timing operations within such units.

The timing circuits themselves often consist of a group of delay units fed from the pulse appearing on the memory select line. By choosing delays of proper duration a pulse may be obtained at any time throughout the core storage unit cycle. Specifically, gate pulses may be obtained by using one delay line to turn on a trigger circuit and a second delay line to turn off the trigger. A self-contained clock or series of single shots of the type disclosed in sections C and G of FIGURE 2 could likewise be used for effecting the timing in memory controls.

The major timing events in such a system are illustrated in the timing chart of FIGURE 6 wherein the first curve represents the read and write pulses which appear coincidently or concurrently on both the X and Y drive lines during the read and write portion of the memory cycle. The opposite polarity of the read and write currents is apparent from the curve. The portion of this curve marked PWD is a "post write disturb" pulse that is passed through X and Y drive lines subsequent to a memory cycle to compensate for problems due to the lack of squareness or perpendicularity of the sides of the hystersis loop and is well known in the magnetic core storage field and will not be mentionel in greater detail.

The second curve indicated as read gate is the pulse supplied to the gating circuits which gate the output of the decoding units into the read drivers and thus produce a read pulse on the X and Y lines. The third curve is the inhibit gate pulse which gates the output of the inhibit drivers into their respective windings during the write portion of the cycle for the purpose explained above. The write gate operates similarly to read gate and gates the output of the X and Y decoders into the write instead of the read drivers for this portion of the cycle. The RO or read out sample pulse occurs during the read portion of the cycle as the name indicates and gates the sense amplifiers during only a small portion of the entire read cycle and serves to eliminate much noise that would otherwise be picked up as is well understood in the art. The last curve entitled "reset buffer register" and "reset storage address register" is a pulse which serves to increment the memory address register if sequential memory locations are to be used during writing operations, or can alternatively be used to reset the memory address register to zero if a new address is to be fed in from program storage. The pulse similarly resets the input, output or memory buffer register, i.e., 96 back to its zero state to allow for storage of a new machine word either to be stored in memory or to be read out from memory. All of the timing systems, sequences, and circuits described herein are quite conventional and the specific details of the operation of any one type may be obtained from most of the sources in the list of references set forth above.

The control of the various operations of such a memory unit is determined by the program which states whether information is to feed from external storage into the memory or whether it is desired to read specific data strings at specific addresses out of the memory. Once having received the program instruction, such a memory control system is essentially autonomous and carries out the instruction whether an input or a read out instruction automatically and after carrying out one instruction is ready to proceed with the next program step.

As stated previously in the specification, Sections A, B, C and D, Memory and Memory controls, comprise the data input section of this system. The Search Sections E, F, G and H will now be described generally with reference still to FIGURE 2, wherein specific details of the operation of each of the specific functional blocks will be described in detail in the specific search example and the timing table for a typical data search instruction.

Section E comprises a register 516 which contains the starting address of a data string where a search of the hierarchically organized data is to begin. This address is gated upon command to the memory address register 300 in main memory, described previously, which provides for the gating out of proper Y line from the 2D memory to enable a search of a level identifier in this line. Register 528 stores the particular level which is to be searched, i.e., a circle for a level which again is obtained from the search program. This identifier is decoded in the decoder 529 which functions to gate an entire Y line from the desired, i.e., ④ special memory plane of the 2D memory, which operation was described with reference to FIGURE 3 previously.

The identifier count or the number of the identifier to be sensed starting from the beginning address is placed in register 562 and again is derived from the program. This count is brought down into the compare circuit 638 and compared against the results from the search ring itself 614. The direction of the search whether left or right is likewise determined from the program input and sets flip-flop 580. The input to this flip-flop is likewise determined from the programmer.

It should also be noted that a do search input is provided to OR circuit 512 which is again derived from the program and it is this input which initates the actual search cycle. In summary, the information from the program necessary to initiate the search cycle is the do search input, the starting address, the identifier marks to be searched, the number of identifiers in each level which are to be counted and recognized and finally, what the direction which each search for each identifier is to have.

Section F includes the search ring and several controls and performs the actual searching of the level planes to provide the absolute beginning and end addresses of a particular bit of data being sought.

With the heirarchical level identifier marks stored in the auxiliary planes of memory section 901, as described above, a particular string of information may be found, provided its relative position in a data string is known, i.e., by first scanning the core plane asssociated with the highest order of classification at the beginning address of the data string to find the memory address in which the highest order of classification for the desired information is located, then dropping down to the core in the next highest order plane which corresponds to this address and continuing the search until the required number of data identifiers have been found in this plane; and so on until the desired address is located. Thus a search instruction of the general type might be starting at address A find the first ④ the second ③ the fifth ② and third ①. While the search generally proceeds in only one direction, it is possible that the search might also have to be conducted in the opposite direction. For example, suppose it is desired to locate next-to-the-last field in the second record of a particular block of data. Here the search proceeds in the first plane until the second record identifier is found, and then back in the other direction in the next plane until the first field identifier is found.

It is, therefore, seen that the search circuitry for such a memory device must be capable of initiating a search in the cores of the identifier planes, or in any other register in which the identifier bits are stored, at any desired position and should be capable of searching the register in either direction for maximum flexibility. The circuit must also be capable of generating an output signal when a bit is found which signal may be encoded to indicate the corresponding memory address. The search circuit must also be capable of continuing the search to succeeding positions if the located address, i.e., level identifier, is not the desired one.

The search circuit includes a multistage search ring 614 into which the binary data content of successive lines of a selected auxiliary plane are gated. The ring thus incorporates a 128 bit storage register capable of storing the data in a line of the auxiliary plane. Means are provided for applying a sampling or interrogation pulse to said ring at the stage corresponding to the starting address of the search instruction. An ouput signal will be generated from a sampled stage of the ring if the corresponding stage of the register has a bit therein. A sampling pulse applied to a stage of the ring is normally propagated onto the succeeding stages by search continuing means to sample the register stages associated with these circuit stages but, if a bit is detected in a stage of the register, this sampling pulse propagation is inhibited. If after locating a bit in a given position of the register, it is desired to continue the search onto succeeding positions, means are provided for reenergizing the search continuing means. The search continuing means is capable of continuing the search in either direction depending on the manner in which it is energized, either by a sampling pulse or by said re-energization means.

Figure 2G:
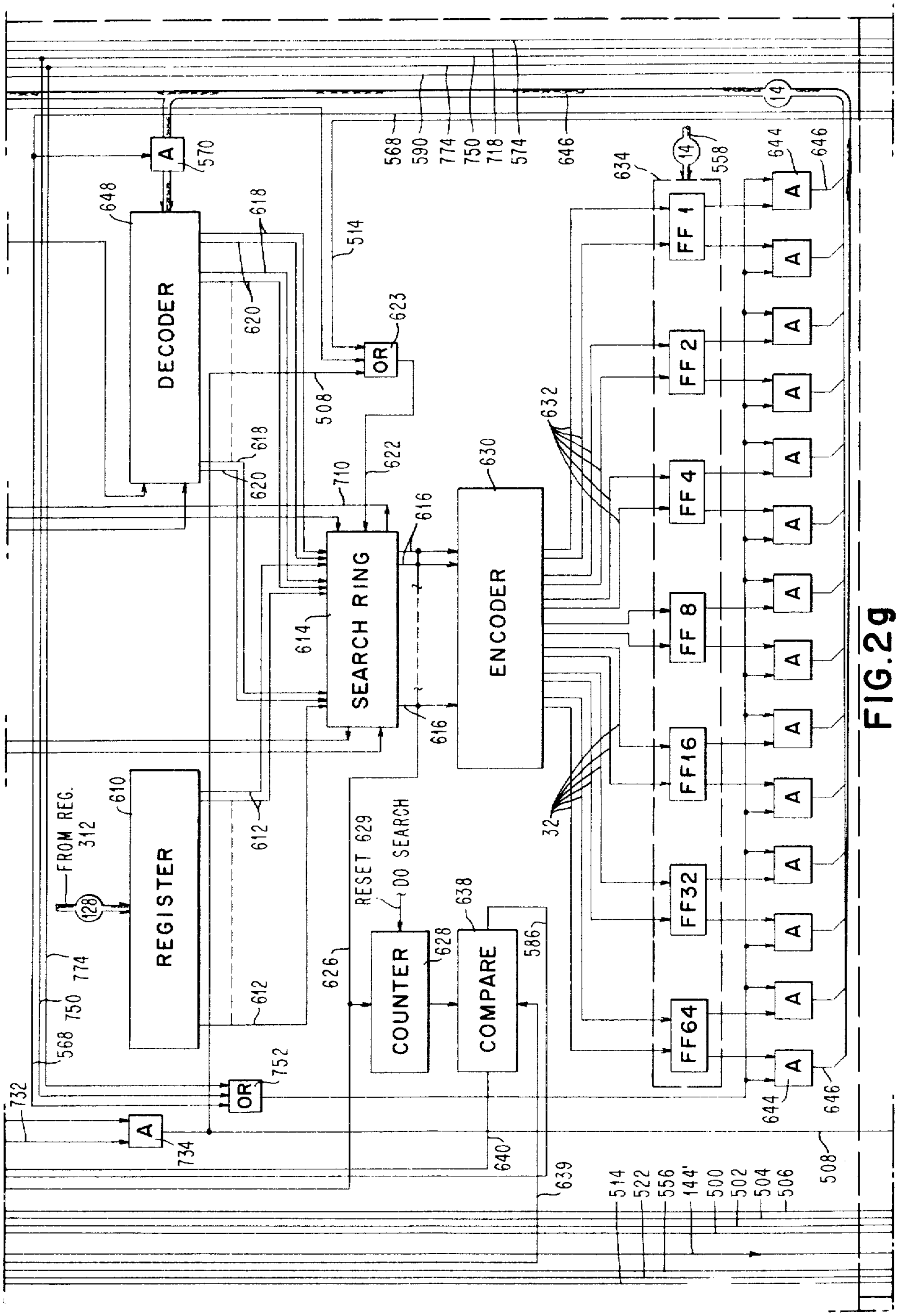
Figure 2H:
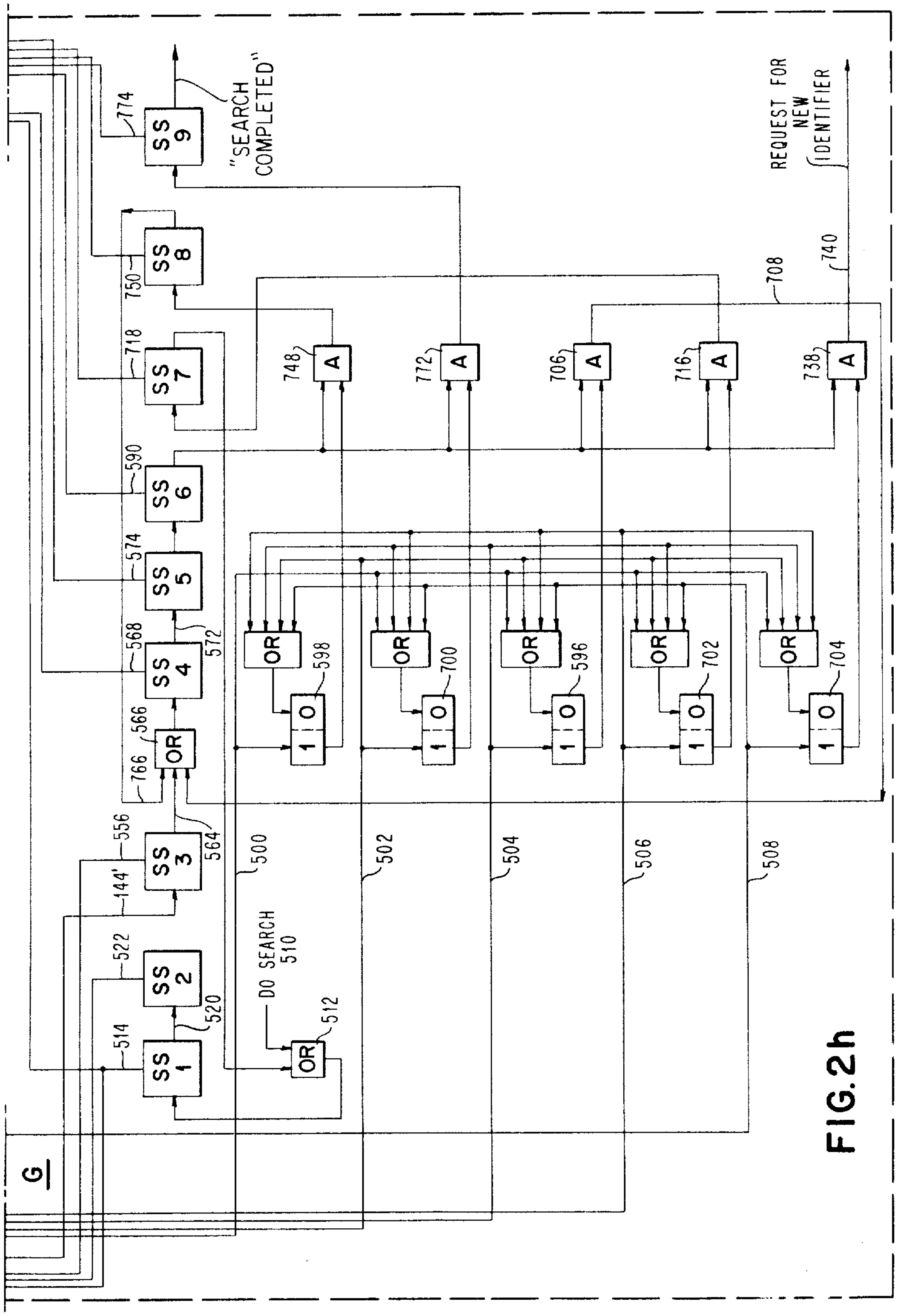

Referring to FIGURE 2*g* which is a portion of Section F, there may be seen a 128 bit storage register 610 each stage of which may exist in either of two stable states. One of these states will be designated the ONE state and the other the ZERO state. When a stage of the register is in its ONE state, it will be said to have a bit stored therein. The individual stages of the register 610 may be conventional flip-flops which generate a continuous steady state output when the stage is in its ONE state, or they may be some sort of pulse generating circuit, such as a magnetic core, which generates an output pulse when it is switched from its ONE to its ZERO state. As stated previously with reference to Section D, the contents of any X line of any of the auxiliary planes 902, 904, etc. may be read out by a full select pulse and gated through gate 34 to register 610.

The outputs from register 610, whether they be D.C. potential levels or pulses, are applied over lines 612 to corresponding stages of search ring 614. The search ring is capable of storing the information contained in register 610 and of sequentially scanning this stored information until a bit is located. This sequential scanning may be started at any point in the ring and may proceed in either direction. The outputs from stages 0 to 127 are fed to the control loop for requesting the next line of data from the auxiliary plane. In this event the desired bit is not located. This operation is described in detail in the search example. When a bit is located in a stage of the ring, an output signal appears on the line 616 corresponding to that stage of the ring and the scan stops. The scan may be reinitiated starting with the succeeding stage to the right of that in which the bit was located by applying a signal to the line 618 corresponding to the stage in which the bit was found, or the search may be continued starting with the adjacent stage to the left of that in which the bit was found by applying a signal to the line 620 associated with the stage in which the bit was found. A pulse applied to reset line 622 from OR circuit 623 is operative to reset all the stages of search ring 614 at the end of each search cycle or in the event the desired mark is not found in the current search and prepares the ring to search the new contents of register 610. Specific details of a suitable search ring for use with the system of the present invention will be found in copending U.S. patent application Serial No. 224,966, filed September 20, 1962, of R. F. Schauer.

An output on any line 616 from search ring 614 is applied through common line 626 to counter 628. A signal on a line 616 is also fed to encoder 630. An input to the encoder 630 causes outputs on seven of the fourteen lines 632, one line from each pair, to be applied to the seven flip-flops, FF1, FF2, FF4, FF8, FF16, FF32 and F64 of address register 634. A signal on the left line 632 of each pair indicates the presence of a bit in that positions and sets the flip-flop it is connected to, to its ONE state while a signal on the right line indicates the absence of a bit in that position (the not condition) and sets the associated flip-flop to its ZERO state. Register 634 indicates in which one of the 128 stages of register 610 the last bit detected was located. The flip-flops of address register 634 may also be set by applying signals to seven of fourteen lines 558 coming from gate 550. This allows the external control circuit to determine where in the search ring 614 a particular search will begin.

The contents of counter 628 are compared in compare circuit 638 with a value set in the compare circuit over line 639 from the search program and register 562. This value is determined by the relative position of the desired information in the data string and is, in the level identifier planes previously described, equal to the number of identifier bits which must be detected before the desired address is found at the identifier level being sampled. When the comparison is successful, a signal goes out to the external control circuitry along line 640 to indicate that the desired address has been found and to, among other things, cause the resetting of the stages of search ring 614. When a comparison is unsuccessful, a signal on line 642 is applied to the fourteen AND gates 644 to gate the outputs from flip-flops FF1–FF64 of address register 634 through seven of the AND gates 644 to energize seven of the fourteen lines 646. The lines 646 are one of the inputs to decoder 648. The other inputs to this decoder are search-right line 650 and search-left line 652. When the search-right line 650 has a signal on it, the decoder 648 energizes the continue-right line 618 which corresponds to the address stored in address register 634. Similarly, when the search-left line 652 has a signal on it, the decoder 648 energized the continue-left line 620 which corresponds to the address stored in address register 634.

The above general description of Section F, the search ring and its associated controls, is general in nature and it is only intended to explain the general function of the circuit. A specific description of the operation of the individual logical elements is presented in the following search example.

Section G is the "Search Clock" and is very similar to the "Input Clock" in that it comprises a series of single shot multivibrators having their inputs and outputs connected as indicated in the drawing of FIGURE 2. The specific detailed operation of this portion of the circuitry again may best be understood by referring to the following search examples where a typical do search input instruction is gone through step by step in conjunction with a timing chart for the search operation.

Section H is merely a storage location containing two registers 764 and 780 where the results of the search operation are stored. The addresses appearing in these registers are used in a well known manner to actually gate information out of the memory into an arithmetic unit or some other external storage means as may be desired. The manner in which the adresses are derived and stored in those registers is clearly described in the search example set forth subsequently.

Having thus described the objects and advantages of the present data handling system and presented a general description of the operations of the various sections of an exemplary embodiment there will now be presented a detailed description of the system. The two following sections entitled "Input Example" and "Search Example" go through logical operations of the circuitry disclosed in FIGURE 2 in step-by-step fashion and clearly explain the operations of the system.

*Input example*

The following Table II is a flow diagram for the "Data Input and Storage" routine of the disclosed embodiment of the invention. The table clearly illustrates the functions of the principal sections of the circuitry including the various stages of the input clock shown in Section G of FIGURE 2. The chronological sequence of events is made very clear by the table and an understanding of the detailed description of the Input Example will be greatly facilitated by referring to the same.

TABLE II.—INPUT CONTROL STEPS

Initially
 Set output ring 11 to 1.
 Set MBR ring 102 to 1.
 Set MBR to nulls.
 Set compare counter 62 to 0.
 Set level ring 58 to all pos. off.
 Set compare FF64 to 0.
Count of 8 the input counter 14 starts clock.
CL–1
 Gate char. to 6.
 Set up compare circuitry.
 Go to CL–2.
CL–2
 Reset input buffer.
 Subtract one from input buffer counter.
 If compare counter is at 1, set compare FF to its "1" state.
 If 1st or no compare→CL–3.
 If 2nd compare and MBR not on 1st pos.→CL–6.
 If 2nd compare and MBR ring on 1st pos.→CL–9.
CL–3
 Gate char. from 6 to MBR.
 Go to CL–4.
CL–4
 If MBR ring is on 8th position and the compare counter is at 0 or 1→CL–6.
 If not→CL–5.
CL–5
 Advance output ring.
 Advance MBR ring.
 Reset 6.
 Go to CL–1.
CL–6
 Initiate memory cycle.
 During this memory cycle, the contents of the MBR will be stored in the 3D memory. If a level identifier has been encountered, it will be stored in the highest plane.
 The "have used memory input" pulse counts down the level ring, resets the MBR to nulls, resets the MBR ring to its 1st position and goes to CL–7.
CL–7
 If level ring is in its zero position and compare counter is at two,→CL–9
 If level ring is not zero→CL–8.
 If level ring is zero and compare counter is at 0 or 1→CL–1.
CL–8
 Initiate 2D memory cycle.
 The "have used memory input" pulse counts down the level ring 58.
 Go to CL–7.
CL–9
 Reset compare counter 62 to zero.
 Reset level ring 58 to zero.
 Reset compare FF64 to 0.
 Go to CL–10.
CL–10
 Gate 6 to compare circuits.
 Go to CL–11.
CL–11
 Set compare FF if compare counter is at one.
 Go to CL–3.

In describing an input operation the following string of input data will be assumed to be stored in the input buffer for storage in main memory. In describing the sequence of operation, it will be helpful to refer to Table II as an aid in understanding the various switching sequences involved.

④ A B C D E F G H I ② J K L M N O P ④

This input data string will be stored physically in memory as shown in Table III below according to the teachings of the present invention.

TABLE III

| | | | | |
|---|---|---|---|---|
| ④ | | | ④ | 2-D level identifier planes (binary storage, i.e., "1") |
| ③ | | | ③ | |
| ② | | ② | ② | |
| ① | | ① | ① | |
| ④ | H | ② | ④ | 3-D portion, each character 11 and 8 bit binary code, therefore, 64 bits per machine word |
| A | I | J | N̸ | |
| B | N̸ | K | N̸ | |
| C | N̸ | L | N̸ | |
| D | N̸ | M | N̸ | |
| E | N̸ | N | N̸ | |
| F | N̸ | O | N̸ | |
| G | N̸ | P | N̸ | |

The table is believed to be self-explanatory. The 2D portion of each column indicates what level identifier marks have been set in each plane i.e., a binary "1" for a given 3D machine word address. The indicator null characters are spaces which are to be ignored. The method for inserting such characters is set forth in the input example following.

In the above string of data it will be noted that the required level identifier ④ is the initiating or first character of the data string to be stored. In describing the storage of this data string, when a subsequent operation is identical to a previous one, it will be so stated rather than completely repeated in a step-by-step fashion.

Referring to the Table II, the initial conditions are set forth. These initial conditions are caused by the "do input" pulse which is supplied from the program. The first eight characters will be gated into the input buffer 10 under control of an advance pulse. It is to be understood that this advance pulse steps the input ring 12 and properly synchronizes the input data going into the input buffer 10 and is a conventional pulse supplied with the data. As each character is entered into the buffer 10 it is counted by the counter 14. The counter 14 is a type of counter which can both add and subtract as is well known in the art. The "advance" pulse is supplied to the incrementing input (not shown) of the counter to effect addition. Subtraction is accomplished by a decrementing pulse appearing on line 72. The counter functions to provide an output on line 222 if the count is between 1 and 7 and an output on line 32, if the count is 8 or more.

When the 8th character has been entered into the buffer 10, line 32 will become active. Line 32 extends to OR circuit 34 and the output of 34 extends to AND circuit 36. Flip-flop 38 is initially set to its (1) state by the "do input" pulse. Therefore, AND circuit 36 will have an output which is differentiated by the differentiating circuit 40 and applied to OR circuit 42 which turns on the single shot 44 which supplies clock pulse No. 1 of the clock. Single shots similar to 44 provide clock pulses sources up to and including clock pulse 11 and will be referred to as clock pulses 1 through 11. During the time that single shot 44 is on, a pulse will exist on line 46. Line 46 extends to the AND circuit 48 and is effective to gate the first character from the buffer 10 via channel 50 to the register 6. And input is also provided to the OR circuit 52 which enables the AND circuit 54. The character in register 6 is thus gated to the level compare circuits 56 and the No. 4 line from this level compare circuit will become active. This will set the 4th position of the level ring 58 and also be transmitted through the OR circuit 60 to set the compare counter 62 to a value of "1." It should be be observed that the compare flip-flop 64 is initially set to its (0) state by the "do input" pulse and thus an output is available on line 66 to enable gate 68 in order for this 4 to be gated into the 4th position of the level ring 58.

When single shot 44 goes off, a pulse is transmitted via line 70 to turn on the single shot for the No. 2 position of the clock. Line 72 will now become active.

The pulse on line 72 is effective to reset the input buffer and subtract one count from the input counter 14. Because the compare counter 62 was set to 1 by the ④, the pulse on line 72 will extend through the OR circuit 74, the AND circuit 76, and set the flip-flop 64 to its (1) state. This is done to prevent a second level identifier in a string of 8 characters of less being gated into the level ring 58. Because the compare counter 62 is on its 1 position, line 78 will transmit its active condition through OR circuit 80 to AND circuit 82, where it is ANDed with line 72 to set flip-flop 84 to its (1) state. Line 86 will now become active and provide an input to AND circuit 88. When the No. 2 single shot in the clock goes off, it will transmit a pulse through AND circuit 88, OR circuit 90, to the No. 3 single shot. Line 92 will next become active. This is effective to enable the gate 94 to transmit the character in register 6 to the first position of the memory buffer register 96. When the No. 3 single shot in the clock goes off, it brings up the No. 4 single shot to provide a pulse on line 98.

Referring to AND circuit 100, it will be noted that one input to this AND circuit is from the 8th position of the memory buffer ring 102. At this time, however, the memory buffer ring is on its first position and AND circuit 100 cannot have an output, therefore inverter 104 will have an output which is applied to the AND circuit 106. The line 98 provides the other input to AND circuit 106 and therefore an output will appear on line 108 which is transmitted to the AND circuit 122. The other input to AND circuit 122 is provided by the pulse on line 114 which occurs when the No. 4 single shot goes off. At this time AND circuit 122 will have an output which will trip single shot No. 5 and provide an output on line 124. The output on line 124 will advance the output ring 12, advance the memory buffer ring 102, and reset register 6. When single shot No. 5 goes off, a pulse will appear on line 126 and extend through OR circuit 42 to trip the No. 1 single shot of the clock. It will be noted that the single shots 1 to 5 inclusive of the clock, provide a loop which is used to take consecutive characters from the input buffer 10 and place them in the memory buffer 6. This loop will be effective 8 times unless a second level identifier is encountered or if the special END conditions denoted by a "blank-input" signal appears. These conditions will be explained later.

For the particular data string in this example, the program loop just described will operate 8 times and the memory buffer register will contain ④ A B C D E F G. On the 8th operation the memory buffer ring 102 will be on its 8th position and line 128 will be active. During clock pulse 4 of this 8th operation, line 128 will provide one input to AND circuit 100. The other input to AND circuit 100 comes from OR circuit 80 which has an output because one of the inputs to OR circuit 80 comes from the No. 1 position of the compare counter 62. Because AND circuit 100 has an output, at the time that line 98 becomes active AND circuit 130 will have an output on line 132 which extends through OR circuit 110 and appears on line 112. This causes AND circuit 116 to become active when the No. 4 single shot goes off and a pulse will be transmitted through OR circuit 118 to trip single shot No. 6. This will initiate a memory cycle. During this memory cycle, the contents of the memory buffer register will be stored in the 3D memory. The ④ will be stored in the No. 4 level plane. This combined operation is performed as follows: Because single shot No. 6 is active and an output level exists on line 134, this output is applied to the memory controls and will cause the usual 3D memory cycle to take place. Because the ④ identifier is present, the compare counter, as mentioned previously, is on its 1 position and an output exists on line 78. This output is transmitted through OR circuit 136 and appears on line 138. 138 and 134 are ANDed by the AND circuit 140. OR circuit 142 will thus have an output which initiates a 2D memory operation. As mentioned before, the 2D operation and the 3D operation occur concurrently.

At the end of the memory cycle a "have used memory-input" pulse will appear on line 144. This pulse will step the level ring 58 from its 4th position to its 3rd position. It will also reset the memory buffer register to all nulls and reset the memory buffer ring 102 to its first position. It will also extend through OR circuit 146 to trip single shot No. 7. Because the level ring 58 is not on its "0" position, line 148 will not have an output. Inverter 150 will therefore have an output on line 152. The output of single shot No. 7 which appears on line 154 extends to AND circuit 156, the other input to which is supplied by line 152. An output will thus appear on line 158 to set the flip-flop 160 to its (1) state. This will provide an output on line 162 which extends to AND circuit 164. AND circuit 164 will thus have an output when the No. 7 flip-flop goes off, to trip single shot No. 8. When single shot No. 8 is active, a pulse will appear on line 166, which is transmitted through OR circuit 142 to initiate a 2D memory cycle. During the cycle the ④ will be stored in the No. 3 level plane. At the end of this 2D memory cycle the "have used memory pulse" again appears on line 144 to count down the level ring from its 3rd position to its 2nd position. This same pulse on line 144 extends through OR circuit 146 to trip single shot No. 7 of the clock. It will be observed that single shots 7 and 8 constitute another loop which is used to store the level identifiers in the planes lower than the value of the level identifier. For example, in the case of the ④, the ④ is stored in the No. 4 plane concurrently with the 3D memory cycle which was initiated by clock pulse 6. Clock pulse 7 tests to see if the level ring 58 is on 0 or some other position and if the level ring 58 is not on 0 it will cause single shot No. 8 to be actuated to initiate another 2D memory cycle. After the 2D memory cycle, clock pulse 7 is again effective to test the level ring. This minor loop constituting single shots 7 and 8 continues until the level ring goes to 0, at which time it is tested by clock pulse 7 and an exit from this loop will be accomplished. The manner in which this is done will now be explained in detail. Because the level ring 58 is on the 0 position, line 148 will be active. The compare counter 62 is still on its 1 position, therefore line 226 will not be active because it extends to the No. 2 position of the compare counter. The inverter 170 will have an output which extends to AND circuit 172. The other input to AND circuit 172 is supplied by line 148. AND circuit 172 thus furnishes one input to AND circuit 174, the other input to which is furnished by the pulse on line 154 which is the output of the No. 7 single shot. Flip-flop 176 will thus be set to its (1) state and line 178 will become active. This line extends to AND circuit 180, the other input to which is furnished by the pulse which occurs when single shot No. 7 goes off. A pulse will thus appear on line 182 which is effective to switch flip-flop 38 back to its (1) state.

Because it is assumed that the output operation is faster than the input, at the end of this string of 8 characters the counter 14 will very likely be at some number less than 8. Line 32 in this case will be down and it will be necessary to wait until this line comes up, which occurs when the count in counter 14 reaches 8. When line 32 comes up, it will transmit its active state through OR circuit 34 and extend to AND circuit 36. Because the other input to AND circuit 36 is provided by the (1) state of flip-flop 38 AND circuit 36 will have an output which is differentiated by the differentiating circuit 40 and applied to OR circuit 42 which will transmit it to actuate the No. 1 single shot of the clock.

In a manner similar to that described previously, the characters H and I will be extracted from the input buffer 10 and placed in the first and second positions of the memory buffer register. It should be remembered that the compare counter 62 is still standing on 1 as a result of the first level identifier which was a ④. The next character encountered after the 1 is a ②. This character will be gated to the register 6 from which it will extend to the level compare circuits 56 and an output will appear on the No. 2 line of the level compare circuits. This output will extend through the OR circuit 60 to advance the compare counter to a count of 2. It will be noted that the No. 2 output of the level compare circuit cannot extend to the level ring because line 66 is down.

The operation just described will occur during clock pulse No. 1. Clock pulse No. 2 will now detect that the compare counter 62 is on its second position and also detect the fact that the memory buffer register is not on its first position. This test is accomplished in the following manner: Because the memory buffer is not on its first position, line 182 will be down. Inverter 184 will thus cause line 186 to be active and provide one input to AND circuit 188. The other input to AND circuit 188 comes from the second position of the compare counter and consequently an output will appear on line 190 which furnishes one input for AND circuit 192. The other input to AND circuit 192 comes from line 72, which is the second clock pulse. Clock pulse No. 2 is thus effective through AND circuit 192 to set flip-flop 194 to its (1) state. This will cause line 196 to become active and provide 1 input to AND circuit 198. The other input to AND circuit 198 is provided when single shot No. 2 goes off. AND circuit 198 at this time will transmit a pulse through OR circuit 118 to trip single shot No. 6. In this manner, a memory cycle will be initiated and during this memory cycle the characters H and I, followed by 6 nulls, will be stored in the 3D position of the memory. No level identifier will be stored during this memory operation. The "have used memory-input" pulse will be applied to count down the level ring 58 but this pulse is ineffective because the level ring is at 0. It will be remembered that in the previous store operation the level ring was counted down by "have used memory-input" pulses which were a result of the successive number 8 clock pulses which occurred during the times that the minor loop, consisting of clock pulses 7 and 8, were in operation. Therefore, at the end of this memory cycle, during which the characters H, I and 6 nulls were stored, the clock will be advanced to position No. 7. The clock pulse 7 will test for a condition where the level ring is in its 0 position and the compare counter is at 2, which is the condition that the machine is in at the moment. Because the compare counter 62 is on 2, line 226 will be active and furnish one input to AND circuit 200. The other input to AND circuit 200 will be supplied by line 148, which is active because the level ring 58 is in its 0 position. AND circuit 200 will now have an output which is applied to one side of AND circuit 202. The other side of AND circuit 202 is supplied by clock pulse No. 7, which appears on line 154. AND circuit 202 is thus effective to set flip-flop 204 to its (1) state and the output of 204 will extend via wire 206 to one side of AND circuit 208. The other input to AND circuit 208 is supplied by single shot No. 7 when it goes off. The output of AND circuit 208 will thus be transmitted through OR circuit 210 to trip single shot No. 9. During the clock time 9, the compare counter 62 will be reset to 0, the level ring 58 will be reset to 0 and the compare flip-flop 64 will be reset to 0. When single shot No. 9 goes off, it trips single shot No. 10. The output of single shot No. 10 extends via wire 212 to and through the OR circuit 52 to the gate 54. In this manner the ②, which is still in register 6, is transmitted to the level compare circuits 56 and an output will appear on the No. 2 line to set the level ring 58 to its No. 2 position and also add 1 count into the compare counter 62 which will thus go to its 1 position. When single shot No. 10 goes off, it will trip single shot No. 11, which will produce a pulse on line 214, which extends through OR circuit 74 and is supplied as one input to AND circuit 76. The other input to AND circuit 76 is supplied by the No. 1 position of the compare circuit 62. In this manner, the compare flip-flop 64 will be set to its (1) state.

When single shot No. 11 goes off, a pulse will appear on line 216, which extends to the OR circuit 90 to trip single shot No. 3. Clock pulse No. 3 will gate the ② character from register 6 to the first position of the memory buffer register. When single shot No. 3 goes off, clock pulse No. 4 will appear to test the position of the memory buffer ring. Because the memory buffer ring is not on the 8th position, clock pulse No. 5 will be initiated. Clock pulse No. 5 will advance the output ring, the MBR ring, reset register 6, and return to single shot No. 1.

Seven more operations will occur during which the characters J K L M N O and P are transferred from the input buffer 10 to the memory buffer register 96. At the end of these seven operations, the memory buffer ring 102 will be in its eighth position, which will cause a memory cycle to be initiated. In this memory cycle the ② will be stored in the No. 2 plane and the contents of the memory buffer register 96 will be stored in the 3D portion of the memory. A second 2D memory cycle will follow, during which the ② is stored in the first level plane, after which flip-flop 38 will again be set to its (1) state.

The last character in the string in this example is a ①. When this character is placed in the input buffer 10, it must therefore be in the first position of this buffer. Immediately after this operation, the "blank input" line 218 will be active. This will supply one input to the AND circuit 220. The other input to AND circuit 220 will be line 222, which is active when there is a count of 1 to 7 in the counter 14. AND circuit 220 will thus have an output which is transmitted through OR circuit 34, AND circuit 36, differentiating circuit 40, OR circuit 42, to trip single shot No. 1. The No. 1 clock pulse will thus gate the ① from the input buffer 10 to the register 6 and the level compare circuits. The ① will provide an output on the No. 4 line of the level compare circuit 56 and this output will be transmitted through the OR circuit 60 to advance the compare counter to its No. 2 position. This output on the fourth line of the level compare circuits 56 cannot be gated into level ring 58 because line 66 is down. Clock pulse No. 2 will follow and detect the fact that the compare counter is in its No. 2 position and also detect the fact that memory buffer ring is on its first position. Because the memory buffer ring is on its first position line 181 will be active and transmit its active condition to one input of AND circuit 224. The other input to AND circuit 224 is provided by the condition of line 226, which extends to the second position of the compare counter 62. The output of AND circuit 224 will thus be transmitted via wire 228 to one side of AND circuit 230. The other input to AND circuit 230 is supplied by clock pulse No. 2 over line 72. The output of AND circuit 230 will thus set flip-flop 232 to its (1) state and an output will appear on line 234 which extends through OR circuit 219 to trip single shot No. 9. Clock pulse 9 will reset the compare counter to 0, reset the level ring to 0, reset the compare flip-flop 64 to 0, and go to clock pulse 10. Clock pulse 10 will gate the ④ again to the compare circuits and this time the fourth position of the level ring 58 will be set and the compare counter 62 will advance to its first position. Clock pulse No. 11 will follow, which will be effective to set the compare flip-flop 64 to its (1) state and return the clock to clock pulse No. 3. Clock pulse No. 3 will gate the ① from register 6 to the first position of the memory buffer register and clock pulse No. 4 will follow. It should have been mentioned that clock pulse 2 subtracted one count from the input buffer 14 when the ④ was removed from the input buffer 10. Consequently, the input counter 14 will be at 0. Because the input counter 14 is at 0, both lines 32 and 222 will be down and both inverters 236 and 238 will have outputs which are applied to the AND circuit 240. As mentioned before, the "blank input" line 218 is up and therefore AND circuit 242 will have an output which extends over wire 244 through the OR circuit 110 to AND circuit 116 via wire 112. The other input to AND circuit 116 is supplied by wire 114, when single shot No. 4 goes off. Thus AND circuit 116 will provide an output which extends through OR circuit 118 to trip single shot No. 6. A memory cycle is thus initiated which will store the ④ in the No. 4 level plane and also store the ④ followed by 7 nulls in the 3D portion of the memory. Three 2D memory operations will follow during which the ④ is stored in the third, second, and first level plane respectively. At the end of the last 2D memory operation, flip-flop 38 will be set back to its (1) state and the machine will wait until the next "do input" command is received.

Referring to FIGURE 3 which is a block diagram of the memory organization, the memory buffer register 97 is the main memory input-output buffer and as is well known stores a machine word read-out of memory and writes said word back upon command. This buffer could be the same as buffer 96 of FIGURES 2*a*–2*f* but for the sake of simplicity will be considered separate. The address of location where a word is to be stored is contained in the register 300, which is conventionally referred to as the "Memory Address Register." The right hand 7 bits of this register are the Y address. The left hand 7 bits are the X address. These X-Y addresses are decoded in order to control both the 3D and the 2D memory operations. The register 300 is also equipped with circuits to enable it to operate as a counter. For example, if this register is initially at all zeros and a write operation is initiated, the word to be written will be written in the zero location in memory. Following this first write operation, a suitable pulse such as the "have used memory pulse" could be applied to this counter to make it read 00000000000001. The next write operation called for would thus store the second word in the No. 1 location in memory. The addresses which are initially placed in register 300 and subsequently incremented by successive single counts are determined by other apparatus in the machine and not part of this invention. Such an availability list or available storage location register is conventional, such a scheme for example is utilized in the above reference Brown patent or the IBM 704 computer as explained in the Customer Engineering Manual. It can be said that another portion of the machine has the responsibility for creating successive lists of memory locations which can be applied to the register 300, in order for the machine shown in this patent to operate satisfactorily. (Reference can be made to magazine articles and other publications concerning the operation of standard core memories both of the 3D and 2D type and it is believed that all of the devices shown diagrammatically in FIGURE 3 are adequately explained by the above mentioned publications.)

In FIGURE 3, the No. 1 level plane is generally designated with the reference character 302. It will be noticed that there are two level gates, 304 and 306, associated with this level plane 302. The gates 304 and 306 are controlled by the memory controls shown diagrammatically in FIGURE 2*c*. For example, in the memory cycle the gate 304 would be enabled during the "read" portion of the cycle and 306 during the "write" portion. In the foregoing description of the storage of the level identifiers, the pulse which would actually store the level identifier in the No. 1 level plane would arrive over channel 308. Channel 308 consists of 128 lines, one of which is selected by the decoder 310, which decodes the Y portion of the memory address into one of 128 lines, thus at the time a word is stored in main (3D) memory a bit list or "1" is stored at the corresponding spot of, for example, the ① level plane.

*Search example*

The following Table IV constitutes a flow chart for the search routine and clearly indicates the functions of the major elements of the system as well as the chronological sequence in which the routine is carried out. The section following the table is a detailed explanation of the functioning of the search circuitry which will be greatly enhanced by reference to the table.

TABLE IV.—STARTING CONDITIONS

These are set up by the instruction "Do Search."
Load starting address register 516.
Load identifier register 528.
Load the count register 562.
Load direction flip-flop 580.
Reset "$\overline{\text{last}}$" (not last) or "last" flip-flop 726 to 0.
Reset counter 628 to 0.

CL–1S
Gate starting address to 300.
Set "end of search" FF to 0.

CL–2S
Gate identifier to memory level controls. Initiates 2D memory cycle. This reads a row of a level plane to 312.

CL–3S
Gate 312 to register 610.
Gate Y starting address to register 634.
Gate count to compare register 638.

CL–4S
Gate contents of register 634 to decoder 648.

CL–5S
Search.

CL–6S
In this clock cycle five tests are made for compare or no compare upon location of an identifier mark.
In conjunction with the states of the overflow flip-flop and the "$\overline{\text{last}}$ or last" flip-flop.
If compare (1st cond) and EOS flip-flop is on "0" (2nd cond) and the "$\overline{\text{last}}$ or last" flip-flop is on $\overline{\text{last}}$ (3rd cond) a signal appears on the line labelled "request for new level identifier."

In this case the search clock stops on the 6th clock pulse.

If compare (1st cond) and EOS flip-flop is on "0" (2nd cond) and the "last or last" flip-flop is on last (3rd cond) go to CL–8S.

If no compare and "end of search" flip-flop is on "1," 90 to CL–9S.

If no compare and no overflow, go to CL–4.

If overflow, go to CL–7S.

CL–7S

Increment or decrement starting address. Go to CL–1S.

CL–8S

Gate 34 to Y portion of the "begin" or "end" registers.

Gate X portion of starting address register to "begin" or "end" registers.

Set EOS flip-flop to 1. Go to CL–4S.

CL–9S

Gate 34 to "begin" or "end" register.

Gate X portion of starting address register to "begin" or "end" registers.

The turn off pulse from this number 9 single shot is used to indicate the "search completed."

The search operation is initiated by a "do search" instruction from the program. Referring to FIG. 2 which shows the search clock Section G, this initiating pulse is applied to line 510. It will extend through OR circuit 512 to trip the #1 single shot of the search clock. This will result in an output on line 514 which can be referred to as clock pulse CL–1S. In addition to starting the search clock, the "do search" instruction sets the starting conditions as listed previously. The output on line 514 is used to gate the starting address which is in register 516 to the register 300 which is the Memory Address Register of the memory unit through OR gate 517. Line 514 is applied to the AND circuit 518 and, as can be seen, the address in 516 will be gated to 300. The #1 single shot now goes off and produces a pulse on line 520 to trip the #2 single shot of the clock. Line 522 now becomes active. 522 extends to AND circuit 524 and the output of AND circuit 524 initiates a 2D memory cycle in the memory unit. Line 522 is applied to AND circuit 526 and is effective to gate the identifier in register 528 to the memory controls via lines 530, and OR circuits 532. The last mentioned controls which extend into the memory control unit over lines 533 are used to enable gates such as 304, 534, and 536. These gates are activated at the proper time during the memory cycle to read out a row of a level plane during the read portion of the memory cycle. This operation will be explained in more detail later. The gate 538 is also enabled at the proper time by the memory clock so that a read out operation can be performed and the row of bits read out into register 312.

The way in which the memory is addressed is as follows. The X address is decoded by the decoders 914 and applied via the gate 934 to an 8X16 array of full select core drivers similar to 548 and 549 designated by the reference character 936. As explained previously this is conventional circuitry which is used in many core memories of this type. In this manner, any one X driver will be selected which, as shown in the diagram, extends through one of the planes of the 2D memory. As explained before, which plane is selected is determined by which one of the gates such as 922, 924 or 926 is enabled by the active line 533 to read out of a row of bits from the level plane selected by the identifier in register 528 and this row of 128 bits is read into the register 312. Gate 538 will be energized by the memory clock during the read portion of the 2D memory cycle. When the "have used memory-search" pulse appears on line 144', it will trip the third single shot of the clock and line 556 will become active. Line 556 extends to gate 314 and is effective to gate the contents of register 312 to the register 610. The line 556 enables gate 550 in order to gate the Y address from register 300 to register 634. Line 556 enables AND circuit 560 to gate the count which is in register 562 to the compare register 638. When single shot #3 goes off, it provides a pulse on line 564 which extends through OR circuit 566 to trip single shot #4 of the clock. This brings up line 568. Line 568 is used to condition AND circuit 570 in order to gate the contents of register 634 to the decoder 648. When single shot #4 goes off, it brings up line 572 which trips single shot #5 and brings up line 574. The output on line 574 is applied to the AND circuits 576 and 578. The other inputs to AND circuits 576 and 578 come from the direction flip-flop 580 which, if set to a 1 will cause the search left to be effective and if set to 0 will cause the search right to be effective. If it be assumed that the overflow flip-flop 582 is in its 1 state and that a search right operation is called for, then AND circuit 584 will have an output which will be applied to the decoder 648. The circuits in the decoder will operate in conjunction with the search ring 614 as described previously to start the search, one position to the right of the Y address which is in the decoder 648. This search will extend in the search ring until a level identifier such as specified in register 528 is encountered. If a level identifier is encountered, an output will occur on line 626 which will increment the counter 628 one count. The number in counter 626 is compared with the number in register 638 and an output will appear on line 586 if they do not compare and an output will exist on line 640 if they do compare. Thus, the compare flip-flop 588 will be set to "0" if the numbers do not compare and will be set to "1" if they do compare. If it be assumed that the first result of the output on line 574 is a "no compare" operation, the flip-flop 588 will be set to "0." As will be explained later, flip-flop 582, the "overflow flip-flop," will remain in its "1" state. The only result of the output on line 574 will be to set the compare flip-flop 588 to "0." When single shot #5 goes off, it trips single shot #6 bringing up line 590. As listed in the table of clock pulses, five tests are made by the output on line 590. Only one of these tests can succeed. The particular one that can succeed in the example shown is the output 504 from the AND circuit 592. The pulse on line 590 is applied to AND circuit 594 the other input to which is supplied by the "1" side of flip-flop 582. The output of AND circuit 594 is applied to one side of AND circuit 592, the other side of which is set by the "0" state of flip-flop 588. In this manner, the pulse on line 590 will appear on line 504. This line 504 extends to flip-flop 596 and sets it to a "1" state. At the same time, the pulse on line 504 sets flip-flops 598, 700, 702, and 704 to their "0" state. AND circuit 706 will thus have an output when single shot #6 goes off which will extend via wire 708 to OR circuit 566 and the output of OR circuit 566 will trip single shot #4 to again bring up line 568. It should be noted that in the previous search operation, the particular position in which the level identifier is encountered will be transmitted to the encoder 630 and encoded into an address which is placed in register 634. The output on line 568 is again effective to gate 634 to the decoder 648 and when single shot #4 goes off, it again trips single shot #5 bringing up line 574 which causes the next search pulse.

Continuing with the example, search pulses must be repeated until the contents of counter 628 agree with the compare register 638. If it be assumed that the second search pulse on line 574 does not find a level identifier in the search ring 614, this pulse will emerge from the right end of the search ring on line 710 and be effective through OR circuits 712 to set the overflow flip-flop 582 to 0. It should be noted that in this case there will be no output on lines 626 which is the input to the counter 628. A clock pulse #6 will follow which is the pulse on line 590. The condition which will be sensed as a result of clock pulse 6 is the output of AND circuit 714 on line 506. Line 506 extends to flip-flop 702 and sets it to its "1" state at the same time it sets flip-flops 598, 700, 596, and 704 to their "0" states. When single shot #6 goes off, it is now effective through AND circuit 716 to trip single shot #7. The output on line 718 will now be applied to AND circuit 720 the other input to which is conditioned by the search right line coming from the "search right" side of 580. The X address in register 516 will now be incremented one count. When single shot #7 goes off, it trips single shot #1 thus returning the clock to clock pulse 1. Clock pulses 1 and 2 are repeated to bring a new row of the selected level plane to register 312 and a new memory cycle is initiated. After the memory cycle, clock pulses 3, 4, 5, and 6 are brought into operation to bring about a first search of this new row of bits. It will be noted now that because flip-flop 582 is on "0" that the output of AND circuit 576 will be directed to line 722 which starts the search at the left end of the search ring. If it be assumed that a level identifier is found, a pulse will appear on line 626. Let it also be assumed that this pulse causes the counter 628 to agree with the compare unit 638. In this case, a pulse will appear on line 640 and set the compare flip-flop 588 to its "1" state. The test which can succeed as a result of clock pulse 6 will be between the compare flip-flop 588, "end of search" flip-flop 724, and the "not-last or last" flip-flop 726. If flip-flop 726 is on "0" which means that the search just completed is not the last identifier in the string a signal must be provided to ask the program for the next level identifier to be searched. This is accomplished in the following manner. Flip-flop 724 is at "0" which means that line 728 will be active. AND circuit 730 will thus have an output because its other input is supplied by the "0" side of flip-flop 726. This output will extend via line 732 and provide one input of AND circuit 734 the other input to which is supplied by AND circuit 736. AND circuit 736 has an output because flip-flop 588 is at "1" and the other side of AND circuit 736 is supplied by the pulse from the line 590. The pulse on line 590 thus extends through AND circuit 736, AND circuit 734, and appears on line 508 to set flip-flop 704 to its "1" state. AND circuit 738 is thus effective when single shot #6 goes off to provide a pulse on line 740 which is an indication to the program that it must supply a new identifier.

*Last identifier in a string*

The flip-flop 726 in this case is set to "1" by the initial conditions which are set up by the "do search" instruction. The search as done by clock pulse CL–5S is the same as previously described, but there will be new conditions to test for during clock pulse CL–6S. If it be assumed that the counter 628 agrees with the compare unit 638 as a result of the application of a CL–5S clock pulse, then the condition to be tested for by the CL–6S is that of a compare, the "EOS" flip-flop 724 on "0" and the flip-flop 726 on "1." The test that succeeds in this case is the output of AND circuit 736, one input to which, is line 590 and the other input to which is the compare flip-flop 588 which is on "1." The output of AND circuit 736 extends via wire 742 to AND circuit 744. The other input to AND circuit 744 comes from AND circuit 746 which is satisfied by the flip-flop 726 being on "1" and flip-flop 724 being on "0." An output will thus exist on line 500 which extends to the flip-flop 598 to set it to a "1" and at the same time set flip-flops 700, 596, 702, and 704 to "0." AND circuit 748 will thus be enabled when single shot #6 goes off to trip single shot #8. This will bring up line 750. Line 750 will extend through the OR circuit 752 to enable the AND circuit 644 and apply the contents of register 634 to the channel 646. Channel 646 extends to AND circuit 754 and AND circuit 756. Because in the earlier part of this description it was assumed that a "search right" operation was in progress, AND circuit 758 will be enabled by the line 760 which is the "0" output of flip-flop 580 and the pulse on wire 750. The output of AND circuit 758 will thus extend through OR circuit 762 to enable AND circuits 754 and 755 which will allow the contents of register 634 to be placed in the Y portion of "begin" register 764 and the X portion of the address in register 516 to be placed in the X portion of register 764. The flip-flop 724 is changed to its "1" state by the pulse on line 750. When single shot #8 goes off, it transmits a pulse via wire 766 and OR circuit 566 to trip single shot #4. Clock pulses 4 and 5 will be repeated and the conditions to be tested for by clock pulse CL–6S is that of a no compare condition and the "EOS" flip-flop 724 in its "1" state. When this condition occurs, AND circuit 768 will have an output because one input is the pulse on line 590 and the other input is the "0" side of the compare flip-flop 588. The output of AND circuit 768 is applied to AND circuit 770. The other input to which is the "1" side of end of search flip-flop 724. An output will thus exist on line 502 which extends to flip-flop 700 to set it to its "1" state also set flip-flops 598, 596, 702, and 704 to their "0" state. AND circuit 772 will thus have an output when single shot #6 goes off to trip single shot #9 and bring up line 774. Line 774 through OR circuit 752 enables AND circuits 644 and also AND circuit 776. The other input to AND circuit 776 is the active condition of line 760 because we are describing a "search right" operation. The output of AND circuit 776 will extend through OR circuit 778 to enable AND circuits 756 and 757 which will allow the contents of register 634 to be placed in the Y portion of "End" register 780 and the X portion of this address stored in register 516 to be placed in the X portion of "End" register 780.

In the above search "example" no specific numbers were used as it is believed that the description did not require same. As set forth in the general description of Section F of FIG. 2 if it were desired to locate the third phrase of the second sentence of the third paragraph of the block of data marked "payroll," the beginning address of this block of data being assumed to be any number, e.g., 1007. The address 1007 in binary form, i.e., 00001111101111, is gated into starting address register 516 and the paragraph or ④ identifier symbol placed in identifier register 528 and the number 3 in count register 562. And since the search is to begin at the beginning of the address the "search right" flip-flop is set accordingly. The search then proceeds as described in detail above until the third ④ is found and the next two steps of the search routine, i.e. (1) find second ③ and (2) third ② are carried out and the address for the beginning and end of this piece of data are stored in register 764 and 780.

In both of the above examples very general uses of input and search operations were performed and every significant operation of the control circuitry discussed. It will be seen that certain of the logical blocks in FIG. 2 have not been specifically given reference numbers. This is because they have not been required in the particular operations explained, however, it is believed that their operation is clearly implied from the above description.

There has been disclosed and described a very flexible data handling system which could be incorporated with certain modifications in a large number of existing computer systems. This system is particularly well adapted for commercial problems where extremely long lists of data are to be placed in memory and operated on and especially for such lists wherein individual segments thereof are of differing field lengths.

The system goes far beyond the standard random access characteristics of usual 3D word organized memories in that it allows accessing the memory through the use of the novel search hardware and routines available with minimal programming, i.e., only the starting address of a particular data string need be known and the relative location of the particular bit of information desired within this string as opposed to the necessity of knowing the absolute address of the particular increment of information desired as is required with standard systems. The system obviously has other ramifications and aspects which cannot be fully set forth herein.

It should be fully understood that the specific embodiment shown for the present system is not to be construed as any way limiting upon the scope of the invention. As set forth specifically, earlier in the specification, other types of memories could equally well be utilized such as the older electrostatic or William's tube types as well as thin film or cryogenic memories. Similarly, the specific read-write control circuits for such memories vary greatly in number and organization and any memory system capable of parallel read and write operations on a data string of machine word length could equally well be used with the present system concept. Similarly, the auxiliary memory which has been described as a 2D core memory in the present embodiment could take a number of different forms. For example, this section of memory could be a portion of the 3D memory, i.e., several planes taken in the word organized direction of a 3D memory and suitable controls utilized to obtain the 2D addressing effect outlined in the embodiment disclosed. Further, in place of sequential read out of the auxiliary planes it would be possible to access more than one plane at a time and store the information from each in separate registers similar to 610 which could then be accessed on demand from the search controls.

Similarly, the various controls in the input and search sections could take on a great many different design configurations. For one example, the particular input search clocks utilizing single shot multivibrators could be replaced by a person skilled in the art utilizing a simple initiating pulse and series of delays and gate circuits as mentioned briefly in the general description of a suitable timing circuit for a typical 3D memory.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An input and search system for hierarchically organized variable field length data for use with a high-speed random access main memory having a plurality of individually addressable fixed field length storage locations wherein the data to be stored and searched contains hierarchical level identifier symbols separating said levels, said system comprising, means for detecting said level identifiers in the input data string and, means for storing an occurrence mark in an auxiliary storage means indicative of the presence of a level identifier in the data string simultaneously with its storage in the main memory, and search means for locating the address of data in the main memory comprising, means for searching said auxiliary storage means for said occurrence marks, means for counting certain of said marks to locate a desired one and, means for deriving an address is main memory for the desired data from said mark.

2. An input and search system for hierarchically organized variable field length data as set forth in claim 1 above wherein the address of said desired portion of data is derived from the address of the associated level identifier mark in the auxiliary storage means.

3. An input input and search system for hierarchically organized variable field length data organization as set forth in claim 2 above wherein the main memory is a 3D word organized random access memory and the auxiliary storage means is a 2D organized memory having a bit storage location for every machine word in the 3D memory.

4. An input and search system for hierarchically organized variable field length data as set forth in claim 3 above wherein the 2D memory is provided with suitable circuitry to selectively address the memory a bit at a time or a word at a time.

5. An input and search system for hierarchically organized variable field length data organization as set forth in claim 4 above including means for applying a full select pulse to a single drive line of said 2D memory to effect line addressing and a half select pulse to two different drive lines of said 2D memory to effect bit addressing.

6. An input and search system for use with the hierarchically organized variable field length data organization as set forth in claim 3 above wherein the 2D and 3D memories utilize a common X and Y address for the simultaneous storage of a machine word and a level identifier mark.

7. An input and search system for hierarchically organized variable field length data as set forth in claim 6 above wherein a separate 2D memory plane is provided for each hierarchical level in the data string including compare means for automatically selecting the proper 2D plane in accordance with the hierarchy of the level identifier sensed.

8. An input and search system for use with hierarchically organized variable field length data as set forth in claim 7 above wherein means are also provided for placing identifier marks in every lower level plane of the 2D memory as well as in the hierarchical level plane for the level identifier actually detected.

9. An input and search system for hierarchically organized variable field length data as set forth in claim 8 above wherein said last named means includes a decrementing counter connected to the output of the compare means which controls the successive storing of lower order level identifier marks after the storage of the detected level mark until a mark has been placed in the lowest order plane.

10. An input and search system for hierarchically organized variable field length data as set forth in claim 9 above wherein the count for a desired level indicator mark in the auxiliary storage means may be initiated at any given address in memory and means are provided for counting in either direction for the desired mark.

11. An input and search system for hierarchically organized variable field length data as set forth in claim 10 above wherein a complete search procedure involves searching and counting marks in different planes of the 2D auxiliary memory and including means for accessing a first plane and searching for a desired mark, means for deriving the address of the desired mark, register means for retaining said address means for, accessing subsequent level planes and continuing the search in the subsequent planes at a point starting with the previously retained address for an additional mark and continuing the search until the final mark and associated address is found.

12. An input and search system for hierarchically organized variable field length data as set forth in claim 1 including an input register having different input and output rates for compensating for the difference in speed between the data input from external data storage means and the high speed input rate of the present system wherein said register has multiple stages and wherein each stage is capable of temporarily storing a complete binary code character.

13. An input and search system for hierarchically organized variable field length data as set forth in claim 12 above wherein an input ring controls the inputing of data from external storage into said register, said ring having control means connected to said register wherein successive characters of data are automatically fed to successive stages of said register.

14. An input and search system for hierarchically organized variable field length data as set forth in claim 13 above, wherein an output ring controls the output of data from successive stages of said register, and wherein both of said control rings are connected end to end whereby when the control rings reach their last position equivalent to the last stage of the register they return automatically to their first position.

15. An input and search system for use with hierachically organized variable field length data as set forth in claim 14 wherein a bi-directional control counter is provided in the output control section for said register, means to increment said counter each time a character is fed into the register and means to decrement said counter each time a character is removed from the register said counter means including means to produce an inhibiting signal effective to prevent outputing from said register under control of the output control ring until a predetermined number of characters are present in the input register.

16. An input and search system for hierarchically organized variable field length data as set forth in claim 15 wherein the input ring is incremented one position each time a character is stored in the input register and the output control means is incremented one position when a character is actually stored in the memory buffer register.

17. An input and search system for use with a hierarchically organized variable field length data organization as set forth in claim 16 including means in the counter circuitry for disabling the inhibiting signal of said counter when an end of data signal is received by the input system.

18. A high-speed binary data handling system wherein data input to the system is of variable field length, is hierarchically organized and contains hierarchical level identifier symbols in the data string preceding and following given portions of data, said system comprising means for serially comparing each character in an input data string to detect and identify said hierarchical level identifier symbols, means for accumulating and storing data input to the system subsequent to said comparison step up to a machine word at a time and operable to automatically store said accumulated data in a main 3D word organized memory, a second auxiliary memory having its addressing controls so interconnected with said first memory that a single bit location in said second memory is automatically associable with a particular word location in said first memory, said second memory having a number of identical portions equal in number to the number of hierarchical levels to be identified in the input data, means associated with said comparing means for writing a bit into said second memory at each location of said second memory corresponding to a location of a machine word in said main memory containing a hierarchical level identifier symbol, the location of said bit in a particular portion of said second memory being further indicative of a particular hierarchical symbol which occurs in the machine word in the main memory, search means for said system comprising program input means for describing the particular occurrence of a particular hierarchical level which it is desired to locate, means for reading out a particular portion of the second memory means, means for searching this portion and locating the occurrences of level identifier symbols in accordance with an input program instruction and means for deriving the address in main memory of the desired level indicator mark located in the second storage means.

19. A data handling system as set forth in claim 18 above wherein said second storage means comprises a 2D memory array which derives its X and Y right addresses directly from the memory address register of the first main storage means and wherein a separate plane of 2D storage is provided for storing occurrences of each different hierarchical level identifier symbols encountered in the data string.

20. A high speed binary data handling system wherein data input to the system is hierarchically organized and contains hierarchical level identifier symbols preceding and following given portions of data said system comprising, input means for receiving said string of hierarchically organized data from an external source, compare means for examining each character of data to determine whether it is a level identifier, means actuable in response to said compare means for producing an output when such a level identifier is detected, first storage means comprising a main word organized 3D memory, a memory buffer register associated with said main memory for temporarily storing and writing data into memory a machine word at a time, means for gating data into said memory buffer register a character at a time subsequent to comparison in said comparison circuitry, means associated with said compare circuitry and with said memory buffer register for allowing only one level identifier to be stored in any one machine word, and means for gating data from the memory buffer register into main memory when said memory buffer register contains a complete machine word or a second level identifier occurs before said memory buffer register is filled, a second memory means having its addressing circuitry so interconnected with the addressing circuitry of said first memory means that the location of a bit in said second memory means is directly indicative of the position in said first memory means of the machine word associated with said bit in said second memory means, said second memory means containing separate and distinct sections for different hierarchies of level identifier symbols, search means for said system comprising registers for storing the initial address of a string of data to be searched, the hierarchy of the levels in said string to be searched, the position in the string of hierarchical levels relative to said initial address which it is desired to locate, and the direction in the string of hierarchical level identifier marks in which the search is to proceed, register means for receiving a contiguous string of hierarchical level symbols from said second memory means, means for searching said string beginning at a given point, and detecting the desired level occurrences in said string, means for storing the address of the desired level identifier in an auxiliary register, and means for controlling the sequential operation of said search routine.

21. A high speed binary data handling system as set forth in claim 20 above wherein means are provided for storing level identifier marks in hierarchical memory sections of said auxiliary storage means in all of the lower levels each time a higher level hierarchical identifier symbol is locatetd, all of said marks referring to the same address in the main memory portion.

22. A high speed binary data handling system as set forth in claim 21 above wherein said compare means includes means for placing the level identifier symbols in only the lowest order position of the memory buffer register and subsequently in the lowest order position in the main 3-D memory and for insuring that only one such level identifier symbol can be stored in any one machine word.

23. A high speed binary data handling system as set forth in claim 22 above wherein said last named means includes, a level identifier symbol occurrence counter means,
input means adapted to advance said counter whenever a heirarchical level identifier symbol is detected by the compare circuitry,
means connected to the number one position of said counter for preventing a second level identifier in a string from being gated into the memory buffer register and,
means connected to the number two positions of said counter for detecting when a second level identifier occurs in said string of data and operative to gate the current contents of the memory buffer register into main memory and hold up the second level identifier symbol so that it can in turn be placed in the lowest order position of the cleared memory buffer register and begin a new machine word.

24. A high speed binary data handling system as set forth in claim 23 above including means to reset the counter to its "0" position upon the gating of a machine word from the memory buffer register to memory.

25. A data input system for examining and storing hierarchically organized variable field length data having hierarchical level identifier symbols included as an integral part of the incoming data string to set off individual hierarchical level segments of the data, said system comprising means for examining each data character being input to determine whether or not it is one of said level identifier symbols,
a main word organized randomly addressable memory means having suitable read-write controls and including a memory buffer register means associated with said first memory means for accumulating characters input to the system subsequent to the examination step and accumulating up to a machine word of such characters at a time and automatically storing same in said first memory means, auxiliary memory means for storing occurrence marks for said hierarchical level identifier symbols in response to said examining means, the location of an occurrence mark in said auxiliary memory means being directly related to the word location in the main memory where such level identifier symbol is actually stored.

26. An input system for hierarchically organized variable field length data as set forth in claim 25 wherein the examining means includes a multistage circuit having one stage for each level identifier in the input string which it is desired to identify wherein the stage of said examining means having a successful comparison will produce an output pulse on an associated line.

27. An input system for hierarchically organized variable field length data as set forth in claim 26 wherein said auxiliary memory comprises a plurality of substantially identical portions at least equal in number to the number of hierarchical levels encountered in the data, each portion having a storage location for each addressable word location in main memory.

28. An input system for hierarchically organized variable field length data as set forth in claim 27 including a means for automatically storing occurrence marks in all of the lower hierarchical level portions of the auxiliary memory whenever a higher level identifier symbol is detected in data and an occurrence mark placed in its associated plane and wherein all of the occurrence marks placed in the different portions of the auxiliary memory in response to a given symbol detection relate to the same word address in main memory.

29. An input system for hierarchically organized variable field length data as set forth in claim 28 wherein said means for storing a plurality of occurrence marks in the different portions of the auxiliary memory comprises a multistage decrementing counter each stage being connected to an associated output line of the various stages of said examination circuitry the input to set a particular count in said counter being determined by the particular level identifier detected by the compare circuitry,
means operative in response to the stage of said multistage counter which is set to determine in which portion of said auxiliary memory the first level identifier occurrence mark will be placed,
means for placing an occurrence mark in the auxiliary memory in accordance with the detected level identifier concurrently with the storage of a machine word in main memory,
means for subsequently decrementing the said multistage counter one position and placing a mark in the next lower level identifier portion using the same address as for the first occurrence mark and repeating this operation until said multistage counter is decremented to its "0" position at which time the inputing of data to the comparison circuits and memory buffer register continues.

30. An input system for hierarchically organized variable field length data as set forth in claim 29 including means for preventing more than one hierarchical level identifier symbol from being stored in any one machine word and
means for storing said level identifier symbol in the lowest order position of the machine word in which it is to be located in the main memory means.

31. An input system for hierarchically organized variable field length data as set forth in claim 30 wherein said means for preventing storage of more than one level identifier symbol in any one machine word includes second counter means connected to the output of said examination means, means responsive to the output of said second counter to prevent the setting of a second compare signal into said multistage counter, prevent the storing of a second level identifier symbol in the memory buffer register and for gating the current contents of the memory buffer register into main memory upon the occurrence of said second level identifier symbol.

32. An input system for hierarchically organized variable field length data as set forth in claim 31 including means associated with said memory buffer register for automatically detecting when a predetermined number of characters are stored in the memory buffer register,
means for automatically gating such word into main memory,
means for inhibiting input into the memory buffer register until such word has been stored in main memory and
means for continuing an input operation.

33. An input system for hierarchically organized variable field length data as set forth in claim 32 including means for resetting the memory buffer register to null characters after a storage cycle whereby when the memory buffer register is incompletely filled on a storage operation the unfilled character positions will have machine recognizable binary coded null indications for said unfilled character positions.

34. An input system for hierarchically organized variable field length data as set forth in claim 33 above including means for controlling the sequence of events of the input system comprising a timing circuit having a plurality of single shot multivibrators therein and wherein only one of said multivibrators will be operative to produce an output signal in any given period of time and wherein at least one of said multivibrators stages will be continuously active until an input sequence is completed.

35. An input system for hierarchically organized variable field length data as set forth in claim 34 wherein said first memory comprises a three dimensional (3-D) word organized random access memory having suitable addressing and driving circuits therefore and said auxiliary storage means comprises a plurality of two dimensional (2D) planes associated with said 3D memory wherein each plane is used to store occurrence marks for different hierarchical level symbols and wherein there are as many storage locations in each said two dimensional plane as there are machine word locations in said main memory.

36. An input system for hierarchically organized variable field length data as set forth in claim 35 including means to store occurrence marks in all of the lower hierarchical level identifier planes of the 2D memory whenever a higher level identifier symbol is detected in data and an occurrence mark is placed in its associated plane, and wherein all of the occurrence marks relate to the same word address in main memory.

37. An input system for hierarchically organized variable field length data as set forth in claim 36 wherein each plane of the 2D memory and the 3D memory have the same number of X and Y drive lines and the identifier marks are addressed and stored by means of half-select driver pulses on X and Y drive lines in the 2D portion of memory corresponding to the X and Y drive lines of the 3D portion of memory in which the level identifier symbol is stored.

38. An input system for hierarchically organized variable field length data wherein said data includes hierarchical level identfier symbols included in the input data string separating the various hierarchies of said data, said system comprising comparison means for serially examining each character input to the system to determine whether or not it is a level identifier symbol, first storage means comprising a three dimensional (3D) word organized randomly accessible memory and addressing and driving circuits therefore, multistage buffer register means for temporary storage of data to be written into said memory, a two dimensional (2D) auxiliary storage means associated with said first storage means having a plurality of substantially identical planes, each plane being adapted for the storage of different hierarchial level identifier marks and wherein each portion has a storage location corresponding to every machine word storage location in said first memory means and wherein the address of a storage location in any one portion of the auxiliary storage means is directly relatable to the address of this corresponding word storage location in said main memory, means associated with said compare circuitry including a decrementing counter which is decremented upon storage of a bit in any portion of the 2D memory and which is set by the particular level output detected by the compare circuitry said counter being effective to cause the storage of a detected level identifier occurrence mark in its associated portion of the auxiliary memory and also the placing of occurrence marks in all of the lower hierarchical level portions of said auxiliary memory having the same address as the detected hierarchical level identifier symbol, further means for preventing the storage of more than one hierarchical level identifier symbol in any one machine word in main memory including a counter means which is effective to prevent the storage of a level identifier symbol in any but the lowest order stage or first character storage location of the memory buffer register, means for automatically gating the contents of the memory buffer register to main memory wherever a predetermined number of characters are stored therein and also for resetting the memory buffer register stages to all null characters after each read out operation and wherein the reading in of a new character to a particular stage automatically changes that stage from a null character to the desired character from the input, and means for controlling the sequence of operations of said input system including a plurality of single shot multivibrator clocks wherein at least one said clock is active continually during an input sequence the predetermined clock sequence continuing until an input operation is terminated.

39. A search system for use with a hierarchically organized variable field length data stored in a main memory, said data containing hierarchical level identifier symbols for separating hierarchical segments of the data, said data being stored in memory such that the hierarchical level identifier symbols appear at the lowest or first position only of a machine word and wherein only one level identifier appears in any one machine word, each level or segment of data being capable of occupying a variable number of machine words or fractional parts thereof, level identifier occurrence marks being placed in an auxiliary memory for every level identifier symbol in the data and stored in main memory, the location of such mark in the auxiliary memory being directly indicative of the address of the associated level identifier symbol and the data to which it pertains in said main memory, said search system comprising means for searching a desired segment of said auxiliary memory beginning at a fixed determinable address therein for said occurrence marks, means for determining whether a detected occurrence mark is the one sought, means for determining the address of the desired occurrence mark in said auxiliary memory when located and means for transferring the same to a suitable register for utilization in the read out of the desired data from memory.

40. A search system for use with a hierarchically organized variable field length data memory system as set forth in claim 39 above wherein said auxiliary memory contains a plurality of substantially identical portions each portion being adapted to store an occurrence mark for a different hierarchical level of data, and wherein for every higher hierarchical level identifier mark stored in the auxiliary memory corresponding to the level of the identifier symbol in main memory, marks occur in all of the lower level portions of the auxiliary memory relating to the same machine word address in main memory as the actual level identifier symbol stored therein, input register means for storing the beginning address where a particular search of the level identifier marks is to begin, register means for storing an indication of which portion of the auxiliary memory is to be searched, register means for storing the sequence count of the level mark being sought relative to the beginning address and means for gating new level indications and occurrence counts for subsequent steps of a sequential search procedure.

41. A search system for use with a hierarchically organized variable field length data memory system as set forth in claim 40 wherein segments of different portions of said auxiliary memory are read out in accordance with the sequential search instruction.

42. A search system for use with a hierarchically organized variable field length data memory system as set forth in claim 40 in which the means for searching a portion of the auxiliary memory includes means for reading out a discrete segment of said portion of the auxiliary memory and placing same in a search ring the segment read out containing the starting address for the search and containing occurrence marks for level identifier symbols in accordance with the order in which the data was input into the memory system.

43. A search system for use with a hierachically organized variable field length data memory storage system set forth in claim 42 wherein said search ring includes register means for storing the binary information read out of the desired segment of a portion of the auxiliary memory, means for searching said data in said register in a desired direction, means in said search ring for developing an output signal whenever an occurrence mark is detected, counter means adapted to be incremented by said output signal, means for comparing the count in said counter with the number stored in said count register, means for selectively causing the search ring to continue the search until a successful comparison is made or to determine the address in the auxiliary memory of the location in which a successful comparison occurred.

44. A search system for use with a hierarchically organized variable field length data memory storage system set forth in claim 43 wherein said last named means includes encoder means for directly receiving the output signals from said search ring the particular stage of the search ring register at which a successful occurrence mark detection is made being directly indicative of the absolute address of said mark in the auxiliary memory.

45. A search system for use with a hierarchically organized variable field length data storage system as set forth in claim 44 including means for gating a new search level indication into the level register and a new occurrence count into the count register and means for continuing the search for said new level occurrence mark in the different level portion of the auxiliary memory as indicated by the level register, said new search being initiated at said last developed address, said searching process continuing sequentially through various level portions of the auxiliary memory until the last address called for is located, means for converting the last obtained address of the search sequence in the auxiliary memory directly into an address of the desired portion of data in main memory and means for storing said address to be used in a data read out operation.

46. A search system for use with a hierarchically organized variable field length data storage system as set forth in claim 45 wherein the main memory comprises a three dimensional (3D) word organized random access memory and The auxiliary memory comprises a two dimensional (2D) memory comprising a series of storage planes a plane being provided for each hierachical level symbol to be encountered in the input data, each plane further having the same number of bit storage locations as there are addressable word storage locations in main memory said two dimensional memory further being characterized in that X, Y address for a bit position in any plane of said 2D memory will address the associated machine word in said main memory and including means for directly decoding a successful comparison address in said search ring into an X, Y address in said plane of the 2D memory and for transferring said address directly to the address registers of said 3D memory.

47. A search system for use with a hierarchically organized variable field length data storage system as set forth in claim 46 including means for reading out one line of a given plane of the 2D memory to the search ring at a time, said search ring including means for automatically reading out the next line of said given plane of the 2D memory in the event the desired occurrence mark is not found within the line of data initially read out, and further means for automatically indexing the starting address register by one count in a direction determined by the direction of the search to enable said new line to be read out of the 2D memory.

48. A search system for use with a hierarchically organized variable field length data storage system as set forth in claim 47 including means for automatically determining both the beginning and end addresses of the desired portion of data in main memory one of whose addresses is determined directly from the above indicated search procedure and the other of whose address is determined by indexing the count register by one and continuing the search in the same direction for the next level identifier in the last portions of said auxiliary memory searched and means for transferring the address of said level identifier from the search ring to a second extent register which address is subsequently used for reading a desired portion of data out of main memory.

49. A search system for use with a hierarchically organized variable field length data storage system as set forth in claim 48 above wherein a series of single shot multivibrators operating as separate clock stages are utilized to control the sequential operation of the search routine wherein one of said clocks is continually active during such search routine.

No references cited.

ROBERT C. BAILEY, *Primary Examiner.*

G. D. SHAW, *Assistant Examiner.*